United States Patent
Jeong et al.

(10) Patent No.: US 11,124,225 B2
(45) Date of Patent: Sep. 21, 2021

(54) STEERING APPARATUS AND METHOD FOR VEHICLE

(71) Applicant: MANDO CORPORATION, Gyeonggi-do (KR)

(72) Inventors: Min Woo Jeong, Gyeonggi-do (KR); HongYong Bhae, Gyeonggi-do (KR); JinMook Park, Gyeonggi-do (KR); Joo Namgung, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 215 days.

(21) Appl. No.: 16/271,712

(22) Filed: Feb. 8, 2019

(65) Prior Publication Data
US 2019/0241207 A1    Aug. 8, 2019

(30) Foreign Application Priority Data
Feb. 8, 2018    (KR) .................. 10-2018-0015519

(51) Int. Cl.
*B62D 5/04* (2006.01)
*B60R 16/023* (2006.01)
(Continued)

(52) U.S. Cl.
CPC .......... *B62D 5/046* (2013.01); *B60R 16/0231* (2013.01); *B62D 5/0484* (2013.01); *B62D 5/0487* (2013.01); *B62D 5/0493* (2013.01); *B62D 15/021* (2013.01); *B62D 5/049* (2013.01); *B62D 5/0496* (2013.01); *H04L 67/12* (2013.01)

(58) Field of Classification Search
None
See application file for complete search history.

(56) References Cited

U.S. PATENT DOCUMENTS 4,624,335 A * 11/1986 Shiraishi ............. B62D 5/0484
                                                         180/404
4,934,474 A *  6/1990 Sugasawa ............ B62D 7/148
                                                         180/404

(Continued)

FOREIGN PATENT DOCUMENTS

EP    3 342 678       7/2018
JP    2015-182622     10/2015
(Continued)

OTHER PUBLICATIONS

Office Action dated Apr. 3, 2019 for Korean Application No. 10-2018-0015519 and its English machine translation by Google Translate.
(Continued)

*Primary Examiner* — Jelani A Smith
*Assistant Examiner* — Melanie J Patrick
(74) *Attorney, Agent, or Firm* — Ladas & Parry, LLP

(57) ABSTRACT

A steering apparatus and method for a vehicle. Steering controllers are connected via an internal communications network. Each of the steering controllers monitors the operating state of another steering controller using the internal communications network, so that, if one of the steering controllers currently controlling the steering motor operates abnormally, the steering motor is controlled by at least one steering controller of the remaining steering controllers.

17 Claims, 20 Drawing Sheets

(51) Int. Cl.
  *B62D 15/02* (2006.01)
  *H04L 29/08* (2006.01)

(56) References Cited

U.S. PATENT DOCUMENTS

| | | | |
|---|---|---|---|
| 5,969,919 | A | 10/1999 | Kobayashi et al. |
| 7,573,690 | B2* | 8/2009 | Kang .................... H02H 3/042 |
| | | | 361/104 |
| 2003/0028303 | A1* | 2/2003 | Sebastian ............... B62D 7/159 |
| | | | 701/41 |
| 2005/0159866 | A1 | 7/2005 | Takeuchi et al. |
| 2015/0084570 | A1* | 3/2015 | Hara ...................... H02P 21/22 |
| | | | 318/494 |
| 2018/0178835 | A1* | 6/2018 | Toko .................... B62D 5/0484 |
| 2018/0208236 | A1* | 7/2018 | Asao .................. H02P 29/0241 |
| 2020/0137099 | A1* | 4/2020 | Haga ..................... B62D 7/159 |
| | | | 701/41 |

FOREIGN PATENT DOCUMENTS

| | | |
|---|---|---|
| JP | 2016-171664 | 9/2016 |
| WO | 2017/122329 | 7/2017 |

OTHER PUBLICATIONS

Extended European Search Report dated Jul. 11, 2019 for European Application No. 19156156.2.

* cited by examiner

FIG.10

| IGN | OFF | ON | | | | ON | ON | OFF |
|---|---|---|---|---|---|---|---|---|
| EngineRPM | Stop | Stop | | | | Run | Stop | Stop |
| Master ECU | ECU_OFF | INIT | SELF_TEST | INIT_COMPLETE | PASSIVE | ASSIST_ACTIVE(Master) | PASSIVE | ECU_OFF |
| Backup ECU | ECU_OFF | INIT | SELF_TEST | INIT_COMPLETE | PASSIVE | ASSIST_STANDBY | PASSIVE | ECU_OFF |

STEERING APPARATUS AND METHOD FOR VEHICLE

CROSS REFERENCE TO RELATED APPLICATION

This application claims priority to Korean Patent Application No. 10-2018-0015519, filed on Feb. 8, 2018, which is hereby incorporated by reference for all purposes as if fully set forth herein.

BACKGROUND

Field

The present disclosure relates to a steering system and, more particularly, to a steering apparatus and method for a vehicle.

Description of Related Art

In general, a steering system is a system able to change the steering angles of wheels of a vehicle, based on steering force (or rotational force) applied to a steering wheel by a driver of the vehicle. Recently, an electric power steer (EPS), i.e. an electric power steering system, has been used in vehicles to provide the reliability of steering by reducing the steering force required to rotate a steering wheel.

Such an electric power steering system may drive a motor, depending on the speed and torque of a vehicle, to provide a driver of the vehicle with optimum steering states. Specifically, a light and convenient steering sensation may be provided in the case of low-speed travel, while a heavy and safe steering sensation may be provided in the case of high-speed travel, and rapid steering may be enabled in an emergency situation.

In particular, demand for redundancy and reliability in steering apparatuses for vehicles is further increasing.

BRIEF SUMMARY

Various aspects of the present disclosure provide a steering apparatus for a vehicle that can improve redundancy and reliability.

Also provided is a steering method for a vehicle that can improve redundancy and reliability.

According to an aspect of exemplary embodiments, a steering apparatus for a vehicle may include: steering controllers controlling a steering motor; and an internal communications network connecting the steering controllers. Each of the steering controllers may monitor an operating state of another steering controller using the internal communications network, so that, if one of the steering controllers currently controlling the steering motor operates abnormally, the steering motor is controlled by at least one steering controller of the remaining steering controllers.

According to another aspect of exemplary embodiments, provided is a steering method for a vehicle, using a first steering controller and a second steering controller connected to each other via an internal communication network. The steering method for a vehicle may include: controlling a steering motor by the first steering controller; monitoring an operating state of the first steering controller by the second steering controller; and if the operating state of the first steering controller is abnormal, based on a result of the monitoring, controlling the steering motor by the second steering controller.

In the steering apparatus for a vehicle according to exemplary embodiments, when a current steering controller malfunctions or is broken, the right of control can be transferred to another steering controller performing a backup function, and it is possible to assist in the steering function of a vehicle without decrease or loss, thereby improving redundancy and reliability of vehicle systems.

BRIEF DESCRIPTION OF THE DRAWINGS

The above and other objects, features, and advantages of the present disclosure will be more clearly understood from the following detailed description when taken in conjunction with the accompanying drawings, in which:

FIG. 10 is a diagram illustrating a normal operating state of the vehicle steering apparatus according to exemplary embodiments;

DETAILED DESCRIPTION

Figure 1:
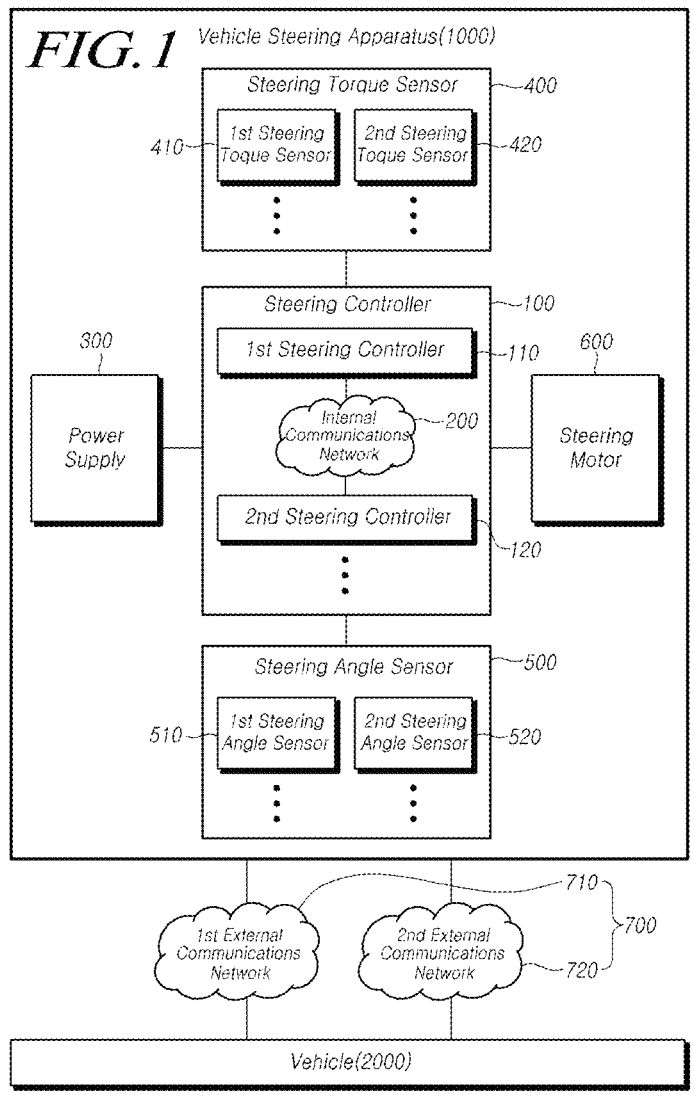
FIG. 1 is a block diagram illustrating an overall configuration of a steering apparatus for a vehicle according to exemplary embodiments.

Hereinafter, exemplary embodiments of the present disclosure will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms.

The following embodiments are provided only to completely disclose the present disclosure and inform those skilled in the art of the scope of the present disclosure, and the present disclosure is defined only by the scope of the appended claims.

Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Hereinafter, a steering apparatus for a vehicle according to exemplary embodiments will be described with reference to the accompanying drawings.

FIG. 1 is a block diagram illustrating an overall configuration of a steering apparatus for a vehicle according to exemplary embodiments.

Referring to FIG. 1, the vehicle steering apparatus for a vehicle (hereinafter, referred to as the "vehicle steering apparatus") 1000 according to exemplary embodiments may include a steering controller 100, an internal communications network 200, and the like.

The steering controller 100 may be connected to a steering motor 600 and control the steering motor 600. The steering controller 100 may be provided as a plurality of steering controllers 110 and 120.

For example, each of the steering controllers 110 and 120 may have the same control function. Each of the steering controllers 110 and 120 having the same control function may control the single steering motor 600 at different points in time.

The steering controllers 110 and 120 may be connected to each other via the internal communications network 200. Here, the internal communications network 200 may mean a private communications network dedicated to steering controllers to connect the steering controllers 110 and 120.

For example, the internal communications network 200 may include at least one of a wired communications network or a wireless communications network. In particular, the internal communications network 200 may include a control area network (CAN), but is not limited thereto. The internal communications network 200 may include any communications network that can connect the steering controllers to each other.

If one steering controller currently controlling the steering motor 600 operates abnormally, each of the steering controllers 110 and 120 may monitor the operating state of another steering controller using the internal communications network 200, so that the steering motor 600 can be controlled by at least one steering controller of the remaining steering controllers.

Specifically, each of the steering controllers 110 and 120 may monitor the operating state of the others thereof via the internal communications network 200, and the right of control of the steering motor 600 may be determined based on the result of the monitoring.

In an example, if the operating state of the steering controller of the steering controllers 110 and 120, currently controlling the steering motor 600, is abnormal, based on the result of the monitoring, each of the steering controllers 110 and 120 may transfer (or move) the right of control of the steering motor 600 from the steering controller currently in control of the steering motor 600 to at least one steering controller of the remaining steering controllers.

In another example, if the operating state of the steering controller of the steering controllers 110 and 120, currently controlling the steering motor 600, is normal, based on the result of the monitoring, each of the steering controllers 110 and 120 may allow the right of control of the steering motor 600 to be retained by the steering controller.

As described above, in the vehicle steering apparatus according to exemplary embodiments, the steering controllers are connected to each other via the internal communications network, and the operating states of the steering controllers may be monitored by each other, so that, if the operating state of one of the steering controllers currently controlling the steering motor is abnormal, the steering motor is controlled by at least one steering controller of the remaining steering controllers. Even if the current steering controller malfunctions or is broken, the right of control can be transferred to another steering controller performing a backup function, and the steering performance of the vehicle can be assisted without a decrease or loss, thereby improving redundancy and reliability of the vehicle.

Although the steering controller 100 according to exemplary embodiments may be comprised of two steering controllers, the present disclosure is not limited thereto and three or more steering controllers may be provided. In particular, one of the plurality of steering controllers may be a primary steering controller (e.g. a first steering controller), while the remaining steering controllers may be sub-steering controllers or redundant steering controllers (e.g. second steering controllers) that can drive the steering motor 600 using the right of control transferred from the primary steering controller.

Hereinafter, the vehicle steering apparatus 1000 according to exemplary embodiments will be described with reference to a case in which two steering controllers 100 are provided, for the sake of brevity.

Although each of the first steering controller 110 and the second steering controller 120 may include an electronic control unit (ECU), the present disclosure is not limited thereto and any electrically-controllable device (or system) may be included.

Continuously referring to FIG. 1, the steering controller 120 may monitor the operating state of the first steering controller 110 controlling the steering motor 600 via the internal communications network 200, and based on the result of the monitoring, may determine the right of control of the steering motor 600.

In an example, if the operating state of the first steering controller 110 controlling the steering motor 600 is abnormal, based on the result of the monitoring, the second steering controller 120 may transfer the right of control of the steering motor 600 thereto from the first steering controller 110. Then, the second steering controller 120 may control the steering motor 600.

In another example, if the operating state of the first steering controller 110 controlling the steering motor 600 is normal, based on the result of the monitoring, the second steering controller 120 may leave the right of control to be retained by the first steering controller. Then, the steering motor 600 may continue to be controlled by the first steering controller 110.

In addition, if the operating state of the first steering controller 110 is abnormal and the operating state of the second steering controller 120 is abnormal, the operation of the steering wheel may be switched to a manual mode or a reduced assist mode.

In an example, if the operating state of the first steering controller 110 is abnormal and the operating state of the second steering controller 120 is abnormal, the second steering controller 120 may switch the operation of the steering wheel to the manual mode or the reduced assist mode.

In another example, if the operating state of the first steering controller 110 is abnormal and the operating state of the vehicle is abnormal, the vehicle may switch the operation of the steering wheel to the manual mode or the reduced assist mode.

In addition, the first steering controller 110 and the second steering controller 120 may be provided as dual controllers to have the same components. As described above, the vehicle steering apparatus according to exemplary embodiments may be provided as a dual system, comprised not only of the dual steering controllers, including the first steering controller and the second steering controller, but also of dual steering torque sensors, dual steering angle sensors, and dual motor position sensors, such that steering control functions, except for the steering motor, may be provided in a single package instead of being provided in two separate modules to control the single steering motor, thereby improving the redundancy and reliability of the vehicle.

Hereinafter, the normal operating state of the vehicle steering apparatus according to exemplary embodiments will be described.

The steering controller may include the first steering controller and the second steering controller. If the ignition is in an off-state and the engine is in a stopped state, both the first steering controller and the second steering controller may be in an off-state. If the ignition is switched to an on state and the engine is in the stopped state, the first steering controller and the second steering controller may test an initialization state. If the result of the initialization state test is normal, the vehicle steering apparatus may be operated in a passive state. If the engine is switched to a running state while the ignition is in an on-state, the first steering controller and the second steering controller may operate the vehicle steering apparatus in a passive state. If the ignition is switched to an off-state while the engine is in a stopped state, the first steering controller and the second steering controller may be switched to an off state.

Hereinafter, the operating state of the vehicle steering apparatus according to exemplary embodiments in the case in which the first steering controller is abnormal will be described.

The steering controller may include the first steering controller and the second steering controller. If the ignition is in an off-state and the engine is in a stopped state, the first steering controller and the second steering controller may be in an off state. If the ignition is switched to an on-state and the engine is in the stopped state, the first steering controller and the second steering controller test an initialization state. If the result of the initialization state test is abnormal, the vehicle steering apparatus may be operated in a passive state, the first steering controller may operate as a slave, and the second steering controller may operate the vehicle steering apparatus in a passive state and may be switched to a standby state to assist the vehicle steering apparatus. If the engine is switched to a running state while the ignition is in the on-state, the first steering controller may operate continuously as the slave, and the second steering controller may assist the vehicle steering apparatus in place of the first steering controller. If the engine is switched to the stopped state while the ignition is in the on-state, the first steering controller may operate continuously as the slave, and the second steering controller may assist the vehicle steering apparatus in place of the first steering controller. If the engine is switched to the off-state while the engine is in the stopped position, both the steering controller and the second steering controller may be in an off-state.

Hereinafter, the operating state of the vehicle steering apparatus according to exemplary embodiments in the case in which both the first steering controller and the second steering controller are abnormal will be described.

The steering controller may include the first steering controller and the second steering controller. In the case in which the ignition is an on-state, the engine is in a running state, and the second steering controller assists the vehicle steering apparatus in place of the first steering controller due to the abnormality of the first steering controller, if the second steering controller is switched to an abnormal state, the vehicle steering apparatus of the vehicle may be switched to a reduced assist mode or a manual mode.

Continuously referring to FIG. 1, the vehicle steering apparatus 1000 according to exemplary embodiments may further include a power supply 300.

The power supply 300 may be connected to the steering controller 100 to supply electrical energy to the steering controller 100. In particular, the power supply 300 may supply a plurality of direct current (DC) voltages to the steering controller 100.

Here, the plurality of DC voltages may include a first DC voltage and a second DC voltage. The first DC voltage may be supplied to the first steering controller 110, and may be referred to as a primary DC voltage. The second DC voltage may be supplied to the second steering controller 120, and may be referred to as sub-DC voltage or a redundant DC voltage.

The operation of the power supply 300 may be controlled and monitored by the first and second steering controllers 110 and 120. In addition, the first and second steering controllers 110 and 120 may monitor the operating state of the power supply 300 and the state of the DC voltage supplied by the power supply 300, and may determine the right of control of the steering motor 600, based on the result of the monitoring.

In an example, the second steering controller 120 may monitor the operating state of the first steering controller 110 via the internal communications network 200, and if the first DC voltage supplied to the first steering controller 110 from the power supply 300 is abnormal, based on the result of the monitoring, transfer the right of control of the steering motor 600 thereto from the first steering controller 110. In addition, the second steering controller 120 may be supplied with the second DC voltage from the power supply 300 and control the steering motor 600 using the received DC voltage.

In another example, the second steering controller 120 may monitor the operating state of the first steering controller 110 via the internal communications network 200, and if the first DC voltage supplied to the first steering controller 110 from the power supply 300 is normal, based on the result of the monitoring, allow the right of control of the steering motor 600 retained by the first steering controller 110. Then, the steering motor 600 may remain being controlled by the first steering controller 110.

Continuously referring to FIG. 1, the vehicle steering apparatus 1000 according to exemplary embodiments may further include a steering torque sensor 400.

The steering torque sensor 400 may include a plurality of torque sensors. For example, the steering torque sensor 400 may include at least one first steering torque sensor 410 and at least one second steering torque sensor 420.

The at least one first steering torque sensor 410 and the at least one second steering torque sensor 420 may measure a torque of the steering wheel and generate torque information of the steering wheel based on the torque of the steering wheel.

The at least one first steering torque sensor 410 may be connected to the first steering controller 110 and provide the torque information of the steering wheel to the first steering controller 110. Here, the first steering torque sensor 410 may be referred to as a primary steering torque sensor.

The at least one second steering torque sensor 420 may be connected to the second steering controller 120 and provide the torque information of the steering wheel to the second steering controller 120. Here, the second steering torque sensor 420 may be referred to as a sub-steering torque sensor or a redundant steering torque sensor.

The operation of the steering torque sensor 400 may be controlled and monitored by the steering controllers 110 and 120. In addition, the steering controllers 110 and 120 may monitor the operating state of the steering torque sensor 400 and the torque information of the steering wheel provided thereto, and based on the result of the monitoring, determine the right of control of the steering motor 600.

In an example, the second steering controller 120 may monitor the operating state of the first steering controller 110 via the internal communications network 200, and if the torque information of the steering wheel provided to the first steering controller 110 from the at least one first steering torque sensor 410 is abnormal, based on the result of the monitoring, transfer the right of control of the steering motor 600 thereto from the first steering controller 110. Then, the second steering controller 120 may receive the torque information of the steering wheel from the at least one second steering torque sensor 420 and control the steering motor 600 based on the received torque information.

In another example, the second steering controller 120 may monitor the operating state of the first steering controller 110 via the internal communications network 200, and if the torque information of the steering wheel provided to the first steering controller 110 from the at least one first steering torque sensor 410 is normal, based on the result of the monitoring, allow the right of control of the steering motor 600 to be retained by the first steering controller. Then, the steering motor 600 may be continuously controlled by the first steering controller 110.

Continuously referring to FIG. 1, the vehicle steering apparatus 1000 according to exemplary embodiments may further include a steering angle sensor 500.

The steering angle sensor 500 may include a plurality of steering angle sensors. For example, the steering angle sensor 500 may include at least one first steering angle sensor 510 and at least one second steering angle sensor 520.

The at least one first steering angle sensor 510 and the at least one second steering angle sensor 520 may measure a steering angle of the steering wheel and generate steering angle information of the steering wheel, based on the steering angle of the steering wheel.

The at least one first steering angle sensor 510 may be connected to the first steering controller 110 and provide the steering angle information of the steering wheel to the first steering controller 110. Here, the first steering angle sensor 510 may be referred to as a primary steering angle sensor.

The at least one second steering angle sensor 520 may be connected to the second steering controller 120 and provide the steering angle information of the steering wheel to second steering controller 120. Here, the second steering angle sensor 520 may be referred to as a sub-steering angle sensor or a redundant steering angle sensor.

The operation of the steering angle sensor 500 may be controlled and monitored by the steering controllers 110 and 120. In addition, the steering controllers 110 and 120 may monitor the operating state of the steering angle sensor 500 and the steering angle information of the steering wheel, and based on the result of the monitoring, determine the right of control of the steering motor 600.

In an example, the second steering controller 120 may monitor the operating state of the first steering controller 110 via the internal communications network 200, and if the steering angle information of the steering wheel provided to the first steering controller 110 from the at least one first steering angle sensor 510 is abnormal, based on the result of the monitoring, transfer the right of control of the steering motor 600 thereto from the first steering controller 110. In addition, the second steering controller 120 may be provided with the steering angle information of the steering wheel from the at least one second steering angle sensor 520 and control the steering motor 600 based on the received steering angle information.

In another example, the second steering controller 120 may monitor the operating state of the first steering controller 110 via the internal communications network 200, and if the steering angle information of the steering wheel provided to the first steering controller 110 from the at least one first steering angle sensor 510 is normal, based on the result of the monitoring, allow the right of control of the steering motor 600 to be retained by the first steering controller 110. Then, the steering motor 600 may be continuously controlled by the first steering controller 110.

Continuously referring to FIG. 1, the vehicle steering apparatus 1000 according to exemplary embodiments may include the steering motor 600.

The steering motor 600 may be connected to the steering controllers 110 and 120. In addition, the operation of the steering motor 600 may be controlled by each of the steering controllers 110 and 120. For example, the operation of the steering motor 600 may be controlled by the first steering controller 110. If the operation of the steering motor 600 is abnormal, the operation of the steering motor 600 may be controlled by the second steering controller 120.

The steering motor 600 may include a single winding motor, but is not limited thereto. The steering motor 600 may be any motor that can be controlled by each of the steering controllers.

Continuously referring to FIG. 1, the vehicle steering apparatus 1000 according to exemplary embodiments may further include an external communications network 700.

The external communications network 700 may include a plurality of external communications networks. For example, the external communications network 700 may include a first external communications network 710 and a second external communications network 720.

The first external communications network 710 may connect the first steering controller 110 and the vehicle 2000, and provide vehicle condition information from the vehicle 200 to the first steering controller 110. Here, the first external communications network 710 may be referred to as a primary external communications network.

The second external communications network 720 may connect the second steering controller 120 and the vehicle 200, and provide the vehicle condition information from the vehicle 200 to the second steering controller 120. Here, the second external communications network 720 may be referred to as a sub-external communications network or a redundant external communications network.

Here, the external communications network 700 may include at least one communications network of a wired communications network or a wireless communications network. In particular, the external communications network 700 may be a control area network (CAN), but is not limited thereto. The external communications network 700 may include any communications network that can connect the steering controllers 110 and 120 and the vehicle 2000.

The operation of the external communications network 700 may be controlled and monitored by each of the steering controllers 110 and 120. In addition, each of the steering controllers 110 and 120 may monitor the operating state of the external communications network 700 and vehicle condition information provided from the vehicle 2000 via the external communications network 700, and determine the right of control of the steering motor 600, based on the result of the monitoring.

In an example, the second steering controller 120 may monitor the operating state of the first steering controller 110 via the internal communications network 200, and if the vehicle condition information provided from the vehicle 200 via the first external communications network 710 is abnormal, based on the result of the monitoring, transfer the right of control of the steering motor 600 thereto from the first steering controller 110. Then, the second steering controller 120 may be provided with the vehicle condition information from the vehicle 200 via the second external communications network 720 and control the steering motor 600 based on the received vehicle condition information.

In another embodiment, if the vehicle condition information provided from the vehicle 200 via the first external communications network 710 is normal, based on the result of the monitoring, the second steering controller 120 may allow the right of control of the steering motor 600 to be retained by the first steering controller 110.

In addition, the steering motor 600 may be continuously controlled by the first steering controller 110. Here, the vehicle condition information may include at least one of, but not limited to, acceleration information, torque information, steering angle information, yaw angle information, pedal information, or engine power information, which may represent the conditions of the vehicle. The vehicle condition information may include any information that may represent the conditions of the vehicle.

In addition, the vehicle condition information may include at least one of, but not limited to, ambient luminance information, rainfall information of surrounding areas, or snowing information of surrounding areas, which may represent the inner, outer, and surrounding environments of the vehicle. The vehicle condition information may include any information that may represent the inner, outer, and surrounding environments of the vehicle.

Figure 2:
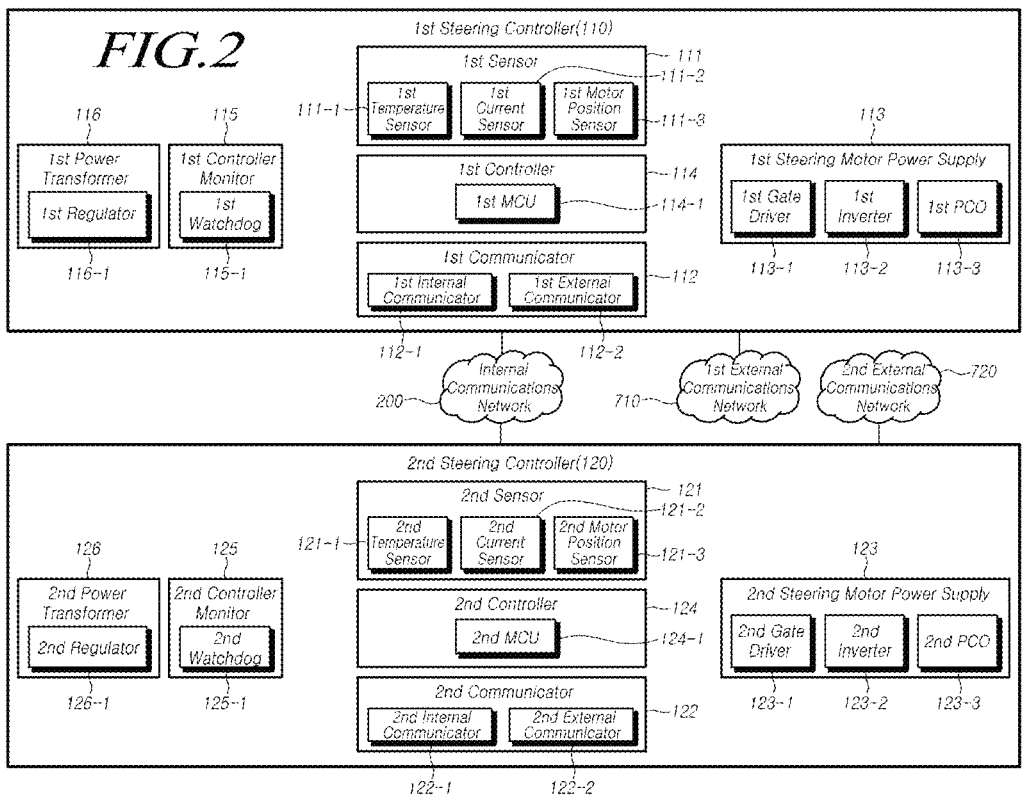
FIG. 2 is a block diagram illustrating a specific configuration of the steering apparatus for a vehicle according to exemplary embodiments.

FIG. 2 is a block diagram illustrating a specific configuration of the vehicle steering apparatus according to exemplary embodiments.

Referring to FIG. 2, the first steering controller 110 may include a first sensor 111, a first communicator 112, a first steering motor power supply 113, a first controller 114, a first controller monitor 115, a first power transformer 116, and the like.

The second steering controller 120 may include a second sensor 121, a second communicator 122, a second steering motor power supply 123, a second controller 124, a second controller monitor 125, a second power transformer 126, and the like.

In particular, since the components of the first steering controller 110 and the components of the second steering controller 120 are the same, only the components of the first steering controller 110 will be described hereinafter for the sake of brevity.

The first sensor 111 may include a first temperature sensor 111-1, a first current sensor 111-2, and a first motor position sensor 111-3, but is not limited thereto. The first sensor 111 may include any sensor that can measure the state of the vehicle steering apparatus.

The first temperature sensor 111-1 may measure the temperature of the first steering controller 110, obtain first temperature information based on the measured temperature, and provide the first temperature information to the first controller 114.

The first current sensor 111-2 may measure first assist current between the first steering motor power supply 113 and the steering motor 600, obtain first assist current information based on the measured first assist current, and provide the first assist current information to the first controller 114.

The first motor position sensor 111-3 may measure the position of the steering motor 600, obtain first motor position information based on the measured position, and provide the first motor position information to the first controller 114.

The first communicator 112 may include a first internal communicator 112-1 and a first external communicator 112-2.

The first internal communicator 112-1 and the first external communicator 112-2 are connected to each other via the internal communications network 200 to transmit and receive information of the first steering controller 110 and the second steering controller 120 to and from each other.

That is, the first internal communicator 112-1 may provide information (e.g. information regarding the operating state of the second steering controller 120) provided from the second steering controller 120 via the steering controller 120 to the first controller 114. In addition, the first internal communicator 112-1 may provide information (e.g. information regarding the operating state of the first steering controller 110) provided from the first controller 114 to the second internal communicator 122-1 via the internal communications network 200.

The first external communicator 112-2 and the vehicle 200 may be connected to each other via the first external communications network 710 to transmit and receive information regarding the first steering controller 110 and the vehicle to and from each other. For example, the first external communicator 112-2 may provide information (e.g. vehicle condition information) provided from the vehicle 200 to the first controller 114 via the first external communications network 710. In addition, the first external communicator 112-2 는 first controller 114 may provide information (e.g. information regarding the operating state of the first steering controller 110) provided from the first controller 114 to the vehicle 200 via the first external communications network 710.

Each of the first internal communicator 112-1 and the first external communicator 112-2 may include a control area network (CAN) communicator, but is not limited thereto. Each of the first internal communicator 112-1 and the first external communicator 112-2 may be include at least one communicator of any wired communicator or any wireless communicator that can connect the steering controllers and the vehicle.

The first steering motor power supply 113 may include a first gate driver 113-1, a first inverter 113-2, a first phase disconnector (PCO) 113-3, and the like.

The first gate driver 113-1 may be connected to the first controller 114 to be provided with a first gate signal, and control the operation of the first inverter 113-2 based on the first gate signal. The first inverter 113-2 may be a DC-AC converter, and be operation-controlled by the first gate driver 113-1 to generate first assist current by voltage-modulating a first DC voltage provided from the power supply 300.

The first inverter 113-2 may include a three-phase inverter, but is not limited thereto. The first inverter 113-2 may be variously implemented according to the steering motor and the power source.

The first PCO 113-3 may be located between the first inverter 113-2 and the steering motor 600 to supply the first assist current provided from the first inverter 113-2 to the steering motor 600 or cut off the supply of the first assist current.

The PCO may be a device or a circuit able to cut off a phase. The PCO may include at least one of, but not limited to, a switch, a breaker, an isolator, or a switch. The PCO may include any device or a circuit that can cut off a phase.

As described above, in the vehicle steering apparatus according to exemplary embodiments, since the single steering motor is shared by the PCOs, the respective inverters can be disconnected by the PCOs, thereby improving the redundancy and reliability of the vehicle.

The first controller 114 may be connected to the first sensor 111, the first communicator 112, the first steering motor power supply 113, the first controller monitor 115, and the first power transformer 116 to control the operations of the first sensor 111, the first communicator 112, the first steering motor power supply 113, the first controller monitor 115, and the first power transformer 116.

For example, the first controller 114 may generate the first gate signal, based on the torque information of the steering wheel provided from at least one first steering torque sensor 410, the steering angle information of the steering wheel provided from at least one first steering angle sensor 510, the first temperature information, the first assist current information, the first motor position information provided from the first sensor 111, and the vehicle condition information (e.g. vehicle acceleration information) provided from the first communicator 112, and control the first assist current of the first inverter 113-2 by providing the first gate signal to the first gate driver 113-1.

Here, the first gate signal may be generated by a preset modulation method. In particular, the preset modulation method may include at least one modulation method of, but not limited to, pulse width modulation, optimal voltage modulation, triangular comparison voltage modulation, and space vector voltage modulation. The preset modulation method may include any modulation method that may generate a gate signal by which the operation of the inverter can be controlled.

The first controller 114 may include a first micro controller 114-1, but is not limited thereto. The first controller 114 may include any device (or computer) that can process (or execute and calculate) a program.

The first controller monitor 115 may be connected to the first controller 114 to monitor the operating state of the first controller 114. For example, the first controller 114 may provide a first watchdog signal to the first controller monitor 115. Then, the first controller monitor 115 may be cleared or generate a first reset signal, based on the first watchdog signal provided from the first controller 114.

In addition, if the first controller monitor 115 is cleared, the first controller 114 may be regarded as operating normally. In addition, if the first controller monitor 115 generates and provides the first reset signal to the first controller 114, the first controller 114 may be regarded as operating abnormally, and may be reset by the first reset signal.

Here, the first watchdog signal may be a signal by which the first controller monitor 115 periodically monitors the operation of the first controller 114 (e.g. an anti-reset signal). That is, the first watchdog signal may be a signal notifying that the program currently executed by the first controller 114 is alive.

The first controller monitor 115 may include a first watchdog 115-1, but is not limited thereto. The first controller monitor 115 may include any device that can monitor the first controller 114. In particular, the first watchdog 115-1 may include a first window watchdog having a deadline, i.e. a start point and an end point.

The first power transformer 116 may generate at least one first operation voltage by voltage-transforming a first DC voltage provided from the power supply 300, and provide the at least one first operation voltage to the first sensor 111, the first communicator 112, the first steering motor power supply 113, the first controller 114, the first controller monitor 115, and the like.

Here, the first operation voltage may be a voltage able to activate the first sensor 111, the first communicator 112, the first steering motor power supply 113, the first controller 114, the first controller monitor 115, and the like. The first operation voltage may be a plurality of voltages, and may be modified depending on the operation voltages of the above-described components.

In addition, the first power transformer 116 may include a DC-DC converter. Here, the DC-DC converter may include a buck converter, but is not limited thereto. The DC-DC converter may include any converter that can receive a first DC voltage and transform the received first DC voltage into a first operation voltage lower than the first DC voltage.

In addition, the first power transformer 116 may include a first regulator 116-1. Here, the first regulator 116-1 may receive the first DC voltage and transform the received first DC voltage into the first operation voltage lower than the first DC voltage.

In addition, the second steering controller 120 may monitor the operating state of the first steering controller 110 currently controlling the steering motor via the internal communications network 200, and if the operating state of the first steering controller 110 is abnormal, based on the result of the monitoring, control the steering motor 600 using at least one of the second sensor 121, the second communicator 122, the second steering motor power supply 123, the second controller 124, the second controller monitor 125, or the second power transformer 126.

For example, the second steering controller 120 may monitor the operating state of the first steering controller 110 currently controlling the steering motor via the internal communications network 200, and if the operating state of the first steering controller 110 is abnormal, based on the result of the monitoring, control the steering motor 600. Specifically, if at least one of the first motor position information of the first sensor 111, the first temperature information of the first sensor 111, the first assist current information of the first sensor 111, the vehicle condition information of the first communicator 112, the first assist current of the first steering motor power supply 113, the first gate signal of the first controller 114, the first watchdog signal of the first controller monitor 115, or the operating voltage of the first power transformer 116 is abnormal, the second steering controller 120 may control the steering motor 600 using at least one of the first sensor 111, the first communicator 112, the first steering motor power supply 113, the first controller 114, the first controller monitor 115, or the first power transformer 116, or at least one of the second sensor 121, the second communicator 122, the second steering motor power supply 123, the second controller 124, the second controller monitor 125, or the second power transformer 126 having the same functions as the formers, i.e. based on at least one information of the second motor information, the second temperature information, or the second assist current information of the second sensor 121, the vehicle condition information of the second communicator 122, the second assist current of the second steering motor power supply 123, the second gate signal of the second controller 124, the second watchdog signal of the second controller monitor 125, or the second operating voltage of the second power transformer 126.

Figure 3:
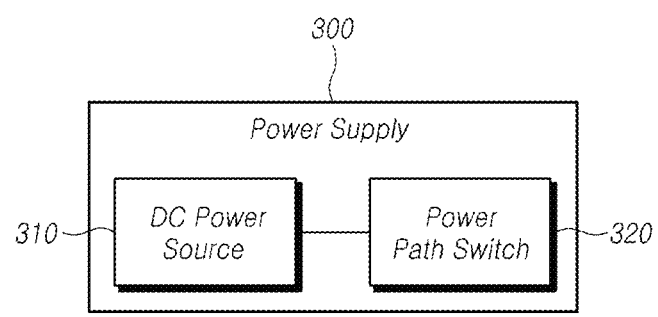
FIG. 3 is a block diagram illustrating an overall configuration of the power supply according to exemplary embodiments.

FIG. 3 is a block diagram illustrating an overall configuration of the power supply according to exemplary embodiments.

Referring to FIG. 3, the power supply 300 according to exemplary embodiments may include a DC power source 310, a power path switch 320, and the like.

The DC power source 310 may provide a DC voltage. For example, the DC power source 310 may provide a first DC voltage to the first steering controller 110, more particularly, to the first regulator 116-1 of the first power transformer 116 and the first inverter 113-2 of the first steering motor power supply 113. In addition, the DC power source 310 may provide a second DC voltage to the second steering controller 120, more particularly, to a second regulator 126-1 of the second power transformer 126 and a second inverter 123-2 of the second steering motor power supply 123.

Here, the first DC voltage and the second DC voltage may be the same DC voltage.

The power supply 300 according to exemplary embodiments may further include the power path switch 320. The power path switch 320 may receive the first DC voltage and the second DC voltage, and provide the first DC voltage to the first steering controller 110 (i.e. the first regulator 116-1 of the first power transformer 116 and the first inverter 113-2 of the first steering motor power supply 113) and the second DC voltage to the second steering controller 120 (i.e. the second regulator 126-1 of the second power transformer 126 and the second inverter 123-2 of the second steering motor power supply 123) by controlling power supply paths.

In addition, the second steering controller 120 may monitor the operating state of the first steering controller 110 controlling the steering motor via the internal communications network 200, and if the first DC voltage supplied from the DC power source 310 (or the power path switch 320) to the first steering controller 110 is abnormal, based on the result of the monitoring, receive the second DC voltage from the DC power source 310 (or the power path switch 320) and control the steering motor 600 using the second DC voltage.

Figure 4:
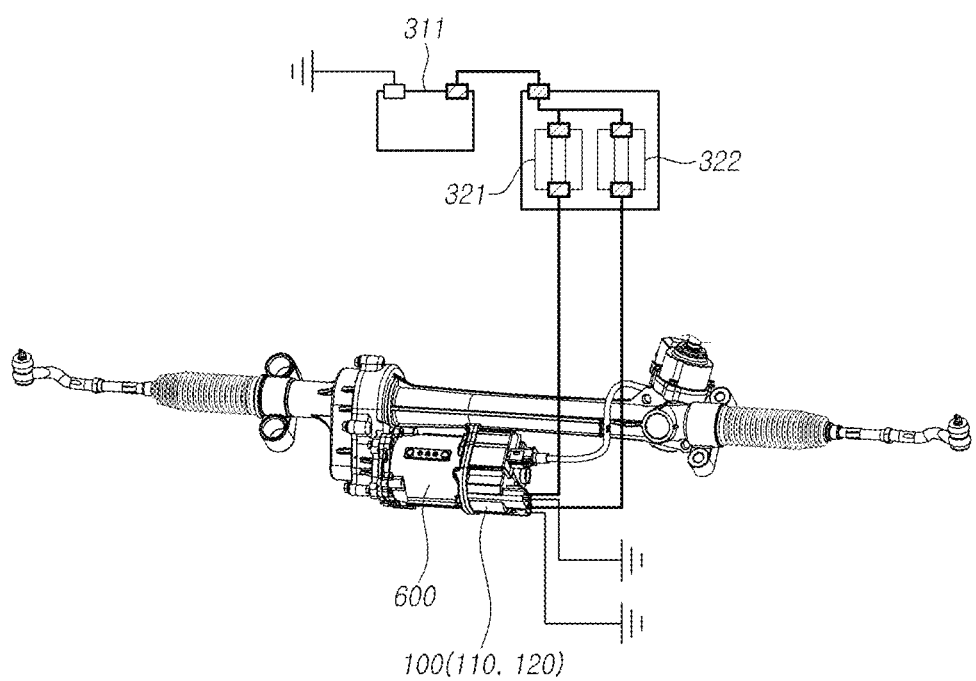
FIG. 4 is a detail view illustrating the power supply according to exemplary embodiments.

FIG. 4 is a detail view illustrating the power supply according to exemplary embodiments.

Referring to FIG. 4, the DC power source 310 may include a battery 311. The battery 311 may supply a DC voltage of 12V, but is not limited thereto. The battery 311 may supply any DC voltage.

The power path switch 320 may include a first fuse 321 and a second fuse 322. The first fuse 321 may be located between the DC power source 310 (or the battery 311) and the first steering controller 110. In addition, the first fuse 321 may provide the first DC voltage, provided from the DC power source 310 (or the battery 311), to the first steering controller 110 (i.e. the first regulator 116-1 of the first power transformer 116 and the first inverter 113-2 of the first steering motor power supply 113).

The second fuse 322 may be located between the DC power source 310 (or the battery 311) and the second steering controller 120. In addition, the second fuse 322 may provide the second DC voltage, provided from the DC power source 310 (or the battery 311), to the second steering controller 120 (i.e. the second regulator 126-1 of the second power transformer 126 and the second inverter 123-2 of the second steering motor power supply 123).

Here, each of the first fuse 321 and the second fuse 322 may include an E-fuse, but is not limited thereto. Each of the first fuse 321 and the second fuse 322 may include any fuse that can supply a DC voltage from the DC power source 310 to the steering controller or cut off the supply of the DC voltage. In particular, the E-fuse may have bi-directional capability.

In addition, the second steering controller 120 may monitor the operating state of the first steering controller 110 controlling the steering motor via the internal communications network 200, and if the first fuse 321 is blown, based on the result of the monitoring, receive the second DC voltage via the second fuse 322 and control the steering motor using the second DC voltage.

In addition, the power supply 300 according to exemplary embodiments may supply the first DC voltage and the second DC voltage using the single battery 311, but is not limited thereto. The power supply 300 may supply the first DC voltage and the second DC voltage using two batteries 311, respectively. That is, the first battery may be connected to the first fuse 321 to supply the first DC voltage, while the second battery may be connected to the second fuse 322 to supply the second DC voltage.

In addition, in the vehicle steering apparatus, the steering motor may be mounted adjacent to a rack, as illustrated in the drawings. According to this configuration, auxiliary steering force of the steering motor, regarding manipulation of the steering wheel by the driver, may be delivered to the rack, thereby facilitating the manipulation of the steering wheel by the driver. However, the present disclosure is not limited thereto, and the type of the vehicle steering apparatus, the position of the steering motor, and the position of the steering controller may be modified.

As described above, in the vehicle steering apparatus according to exemplary embodiments, if the first DC voltage supplied from the DC power supply to the first steering controller is abnormal, the second steering controller can receive the second DC voltage from the DC power supply and control the steering motor using the second DC voltage. Even if the right of control is transferred to another steering controller performing a backup function, the second DC voltage can be continuously supplied using the redundant battery, and it is possible to assist in the steering function of the vehicle without decrease or loss, thereby improving the redundancy and reliability of the vehicle.

Figure 5:
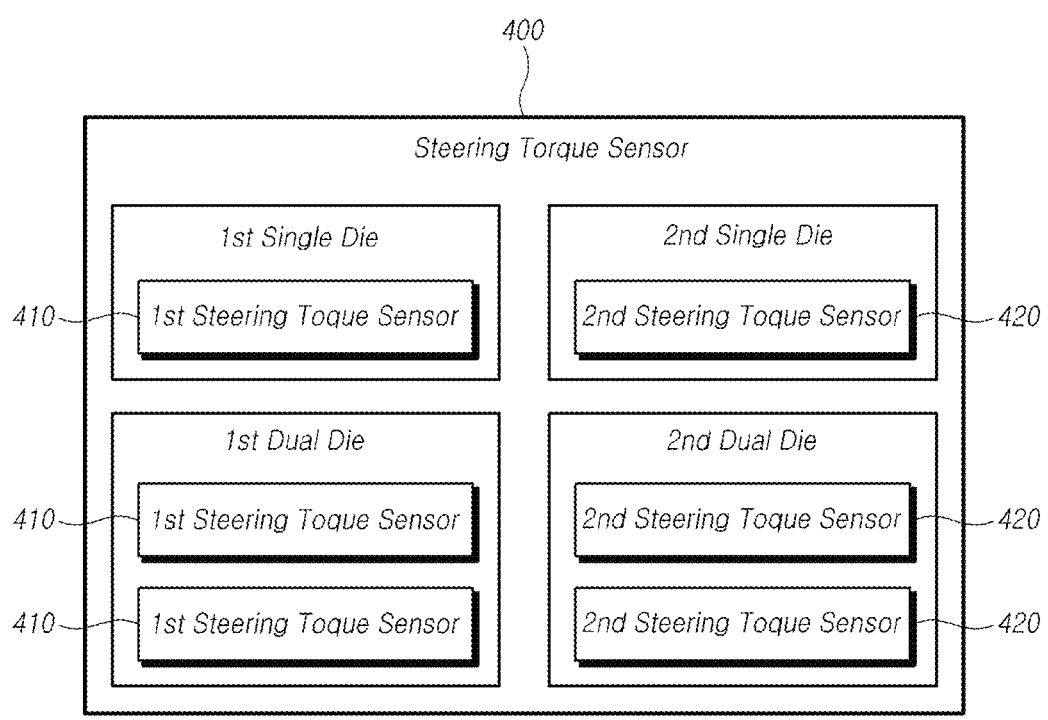
FIG. 5 is a block diagram illustrating a specific configuration of the steering torque sensor according to exemplary embodiments.

FIG. 5 is a block diagram illustrating a specific configuration of the steering torque sensor according to exemplary embodiments.

Referring to FIG. 5, the steering torque sensor 400 may include the at least one first steering torque sensor 410 and the at least one second steering torque sensor 420.

In addition, the steering torque sensor 400 may include dies. The dies may include at least one die of a single die including one steering torque sensor and a dual die including two steering torque sensors, but are not limited thereto. The dies may be modified depending on the number of the steering torque sensors.

For example, the steering torque sensor 400 may include a first single die including a single first steering torque sensor 410, a first dual die including two first steering torque sensors 410, a second single die including a single second steering torque sensor 420, a second dual die including two second steering torque sensors 420, and the like.

In addition, the second steering controller 120 may monitor the operating state of the first steering controller 110 via the internal communications network 200, and if torque information of the steering torque provided from the at least one first steering torque sensor 410 to the first steering controller 110 is abnormal, based on the result of the monitoring, receive torque information of the torque wheel from the at least one second steering torque sensor 420 and control the steering motor based on the torque information received from the at least one second steering torque sensor 420.

Figure 6:
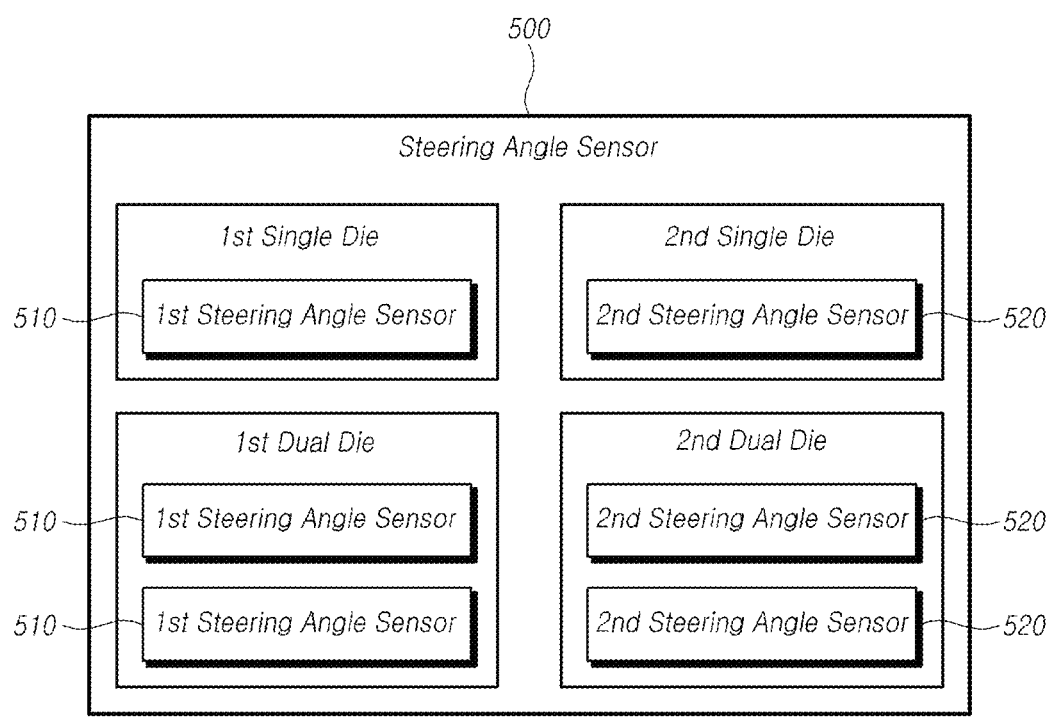
FIG. 6 is a block diagram illustrating a specific configuration of the steering angle sensor according to exemplary embodiments.

FIG. 6 is a block diagram illustrating a specific configuration of the steering angle sensor according to exemplary embodiments.

Referring to FIG. 6, the steering angle sensor 500 may include the at least one first steering angle sensor 510 and the at least one second steering angle sensor 520.

In addition, the steering angle sensor 500 may include dies. The dies may include at least one die of a single die including one steering angle sensor and a dual die including two steering angle sensors, but are not limited thereto. The dies may be modified depending on the number of the steering angle sensors.

For example, the steering angle sensor 500 may include a first single die including a single first steering angle sensor 510, a first dual die including two first steering angle sensors 510, a second single die including a single second steering angle sensor 520, a second dual die including two second steering angle sensors 520, and the like.

In addition, the second steering controller 120 may monitor the operating state of the first steering controller 110 via the internal communications network 200, and if steering angle information of the steering wheel provided from the at least one first steering angle sensor 510 to the first steering controller 110 is abnormal, based on the result of the monitoring, receive steering angle information of the steering wheel from the at least one second steering angle sensor 520 and control the steering motor based on the steering angle information received from the at least one second steering angle sensor 520.

Figure 7:
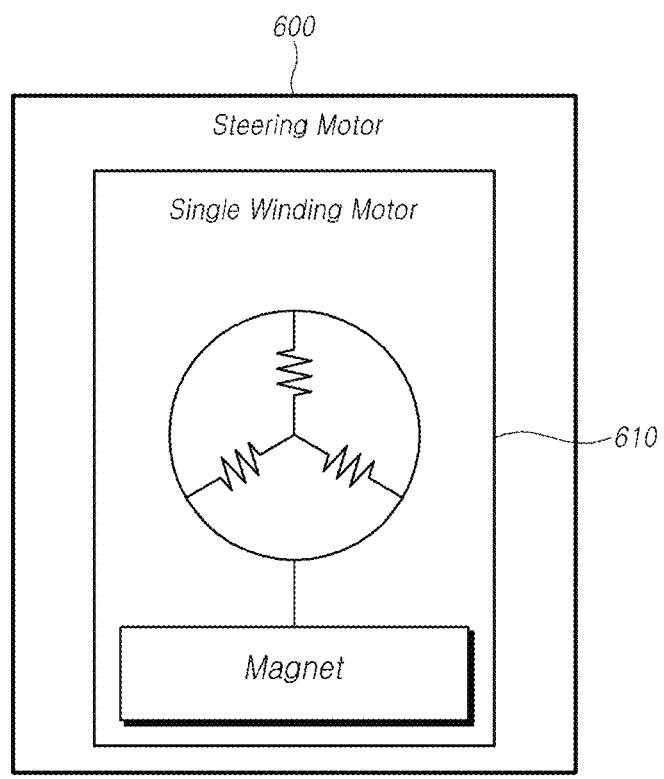
FIG. 7 is a block diagram illustrating a specific configuration of the steering motor according to exemplary embodiments.

FIG. 7 is a block diagram illustrating a specific configuration of the steering motor according to exemplary embodiments.

Referring to FIG. 7, the steering motor 600 may include a three-phase single winding motor, but is not limited thereto. The steering motor 600 may include any motor that can provide auxiliary steering force to the wheels of the vehicle. In addition, the magnet may include a circular magnet, but is not limited thereto. The shape of the magnet may be modified.

In addition, each of the first steering controller 110 and the second steering controller 120 may control the single winding steering motor 610. In addition, the second steering controller 120 may monitor the operating state of the first steering controller 110 controlling the single winding steering motor 610 via the internal communications network 200, and if the operating state of the first steering controller 110 is abnormal, based on the result of the monitoring, control the single winding steering motor 610 in place of the first steering controller 110.

In addition, the magnetic flux of the magnet may be measured by the first motor position sensor 111-3 of the first steering controller 110 and the second motor position sensor 121-3 of the second steering controller 120. In addition, the first motor position sensor 111-3 of the first steering controller 110 and the second motor position sensor 121-3 of the second steering controller 120 may measure the position of the steering motor 600 based on the measured magnetic flux of the magnet and obtain position information of the steering motor 600 based on the position of the steering motor 600.

As described above, since the vehicle steering apparatus according to exemplary embodiments can control the single winding steering motor using the first steering controller and the second steering controller, it is possible to reduce the price of the vehicle steering apparatus and improve the redundancy and reliability of the vehicle.

Figure 8:
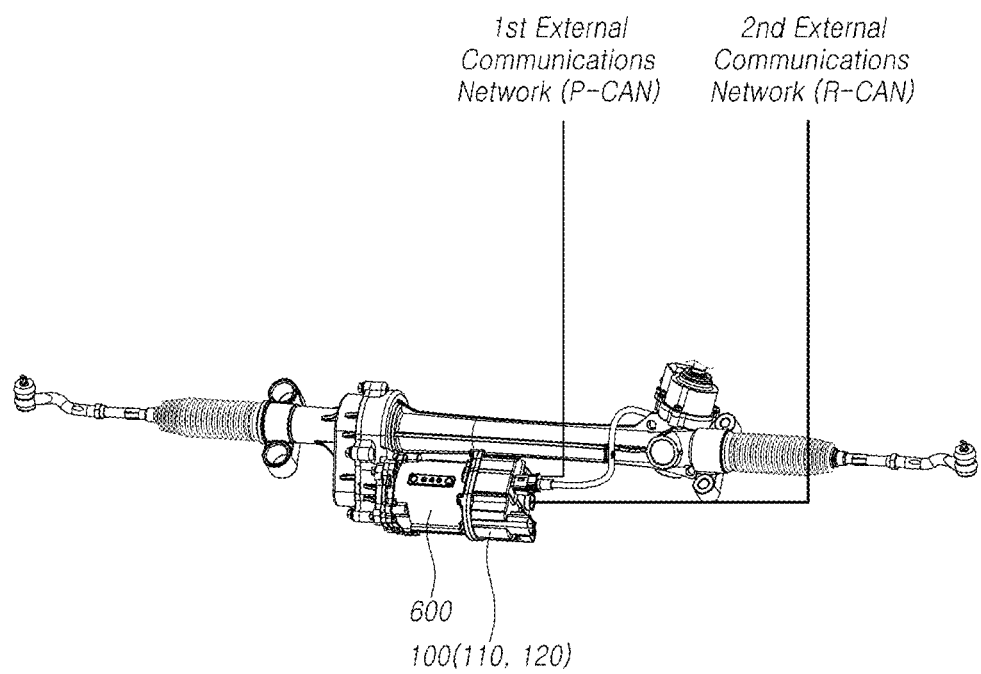
FIG. 8 is a detail view illustrating a specific communications 20 configuration of the external communications network according to exemplary embodiments.

FIG. 8 is a block diagram illustrating a specific configuration of the external communications network according to exemplary embodiments.

Referring to FIG. 8, the first external communications network 710 may connect the first steering controller 110 and the vehicle 2000. Here, the first external communications network 710 may be a primary CAN (P-CAN).

In addition, the second external communications network 720 may connect the second steering controller 120 and the vehicle 2000. Here, the second external communications network 720 may be a redundant CAN (R-CAN).

In addition, the first steering controller 110 may receive vehicle condition information from the vehicle 2000 via the first external communications network 710 and control the steering motor 600 based on the received vehicle condition information. In addition, if the right of control of the first steering controller 110 is transferred to the second steering controller 120, the second steering controller 120 may receive vehicle condition information from the vehicle 2000 via the second external communications network 720 and control the steering motor 600 based on the received vehicle condition information.

Figure 9:
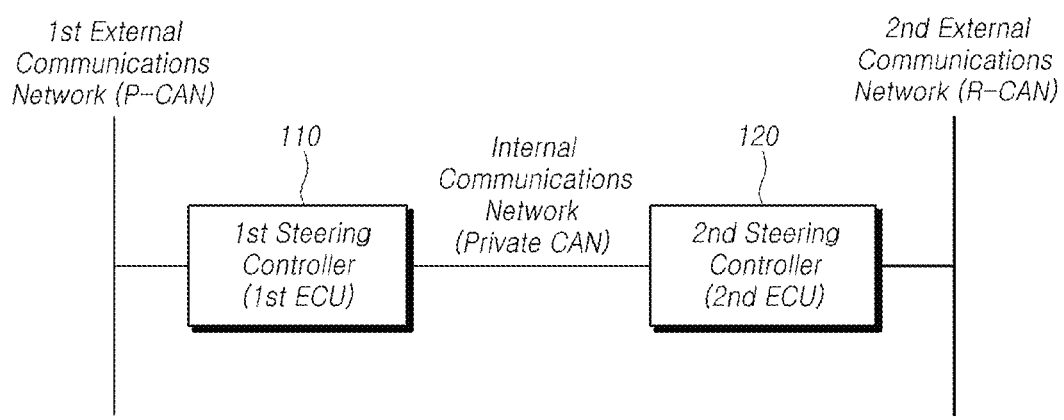
FIG. 9 is a block diagram illustrating a specific configuration of the internal communications network and the external communications network a according to exemplary embodiments.

FIG. 9 is a block diagram illustrating a specific configuration of the internal communications network and the external communications network according to exemplary embodiments.

Referring to FIG. 9, the first steering controller 110 may include a first ECU, while the second steering controller 120 may include a second ECU. The first steering controller 110 may be connected to the first external communications network 710, while the second steering controller 120 may be connected to the second external communications network 720. In addition, the first steering controller 110 and the second steering controller 120 may be connected to each other via the internal communications network 200. In particular, the internal communications network 200 may be a private CAN (P-CAN).

In addition, the second steering controller 120 may monitor the operating state of the first steering controller 110 via the internal communications network 200, and if vehicle condition information provided from the vehicle 2000 via the first external communications network 710 is abnormal, based on the result of the monitoring, receive vehicle condition information from the vehicle 2000 via the second external communications network 720 and control the steering motor 600 based on the vehicle condition information received via the second external communications network 720.

As described above, if the vehicle condition information provided from the vehicle via the first external communications network is abnormal, the vehicle steering apparatus according to exemplary embodiments can receive vehicle condition information from the vehicle via the second external communications and control the steering motor based on the vehicle condition information received via the second external communications network. Accordingly, even if the right of control is transferred to another steering controller performing a backup function, the vehicle steering apparatus can continuously communicate with the vehicle via the redundant external communications network, thereby assisting the vehicle without decrease or loss in the steering performance and improving the redundancy and reliability of the vehicle.

Hereinafter, the operation of the vehicle steering apparatus will be described with reference to FIGS. 10 to 12. In particular, hereinafter, the first steering controller 110 will be referred to as a master ECU, and the second steering controller 120 will be referred to as a backup ECU. FIG. 10 is a diagram illustrating a normal operating state of the vehicle steering apparatus according to exemplary embodiments.

Referring to FIG. 10, if the ignition IGN is in an off-state and the engine is in a stopped state, the master ECU and the backup ECU may in an off-state. Afterwards, if the ignition IGN is switched to an on-state and the engine is in the stopped state, the master ECU and the backup ECU may test an initialization state. If the result of the initialization state test is normal, the vehicle steering apparatus may be operated in a passive state.

Subsequently, if the ignition IGN is in the on-state and the engine is switched to a running state, the master ECU may assist the vehicle steering apparatus, while the backup ECU may remain in a standby state and monitor the master ECU.

Afterwards, if the ignition IGN is in the on-state and the engine is switched to the stopped state, the vehicle steering apparatus may be operated in the passive state. Subsequently, if the engine is in the stopped state and the ignition IGN is switched to the off-state, both the master ECU and the backup ECU may be in an off-state.

Figure 11:
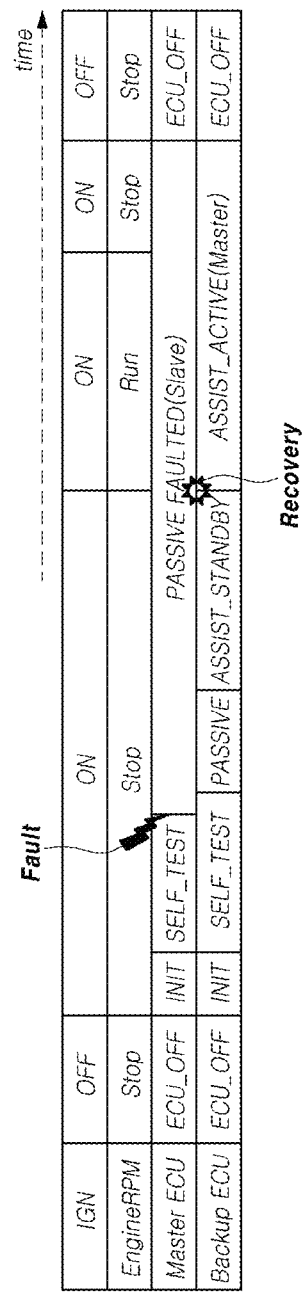
FIG. 11 is a diagram illustrating an operating state in the case in which the master ECU of the vehicle steering apparatus according to exemplary embodiments is abnormal.

FIG. 11 is a diagram illustrating an operating state in the case in which the master ECU of the vehicle steering apparatus according to exemplary embodiments is abnormal.

Referring to FIG. 11, if the ignition IGN is an off-state and the engine is in a stopped state, both the master ECU and the backup ECU may be in an off-state. Afterwards, if the ignition IGN is switched to an on-state and the engine is in the stopped state, the master ECU and the backup ECU may test an initialization state. If the master ECU is abnormal, based on the result of the initialization state test, the master ECU may operate as a slave while the backup ECU may operate the vehicle steering apparatus in a passive state and be switched to a standby state to assist the vehicle steering apparatus.

Subsequently, if the ignition IGN is in the on-state and the engine is switched to a running state, the master ECU may remain operating as the slave while the backup ECU may assist the vehicle steering apparatus in place of the master ECU.

Afterwards, if the ignition IGN is in the on-state and the engine is switched to the stopped state, the master ECU may remain operating as the slave while the backup ECU may assist the vehicle steering apparatus in place of the master ECU. Subsequently, if the engine is in the stopped state and the ignition IGN is switched to the off-state, both the master ECU and the backup ECU may be in an off-state.

Figure 12:
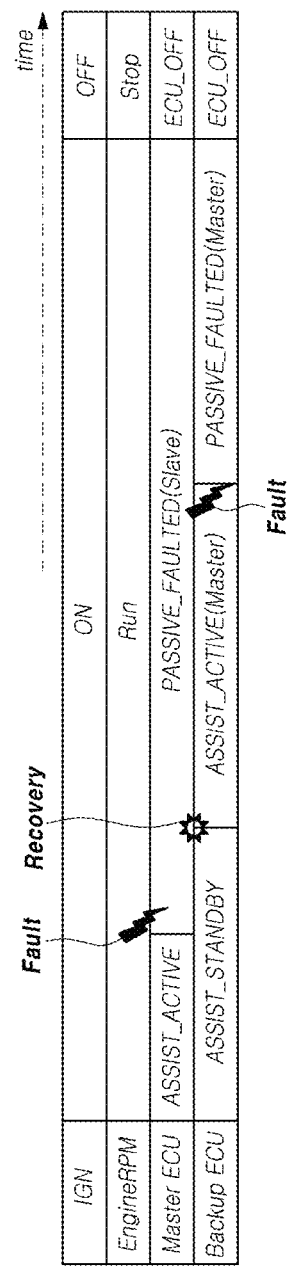
FIG. 12 is a diagram illustrating an operating state in the case in which the master ECU and the backup ECU of the vehicle steering apparatus according to exemplary embodiments are abnormal.

FIG. 12 is a diagram illustrating an operating state in the case in which the master ECU and the backup ECU of the vehicle steering apparatus according to exemplary embodiments are abnormal.

Referring to FIG. 12, in the case in which the ignition IGN is in an on-state, the engine is in a running state, and the backup ECU assists the vehicle steering apparatus in place of the master ECU due to the abnormality of the master ECU, if the backup ECU is abnormal, the vehicle steering apparatus of the vehicle may be switched to a reduced assist mode or a manual mode.

Hereinafter, a steering method for a vehicle (hereinafter, referred to as a "vehicle steering method") according to exemplary embodiments will be described with reference to the accompanying drawings. In particular, in the following, descriptions of some features will be omitted for the sake of brevity, since they are identical to those of the vehicle steering apparatus according to exemplary embodiments described above with reference to FIGS. 1 to 12.

The vehicle steering method according to exemplary embodiments may be carried out using the vehicle steering apparatus according to exemplary embodiments including the first steering controller 110 and the second steering controller 120 connected to each other via the internal communications network 200. In particular, the first steering controller 110 and the second steering controller 120 may be provided as dual components to be the same.

Figure 13:
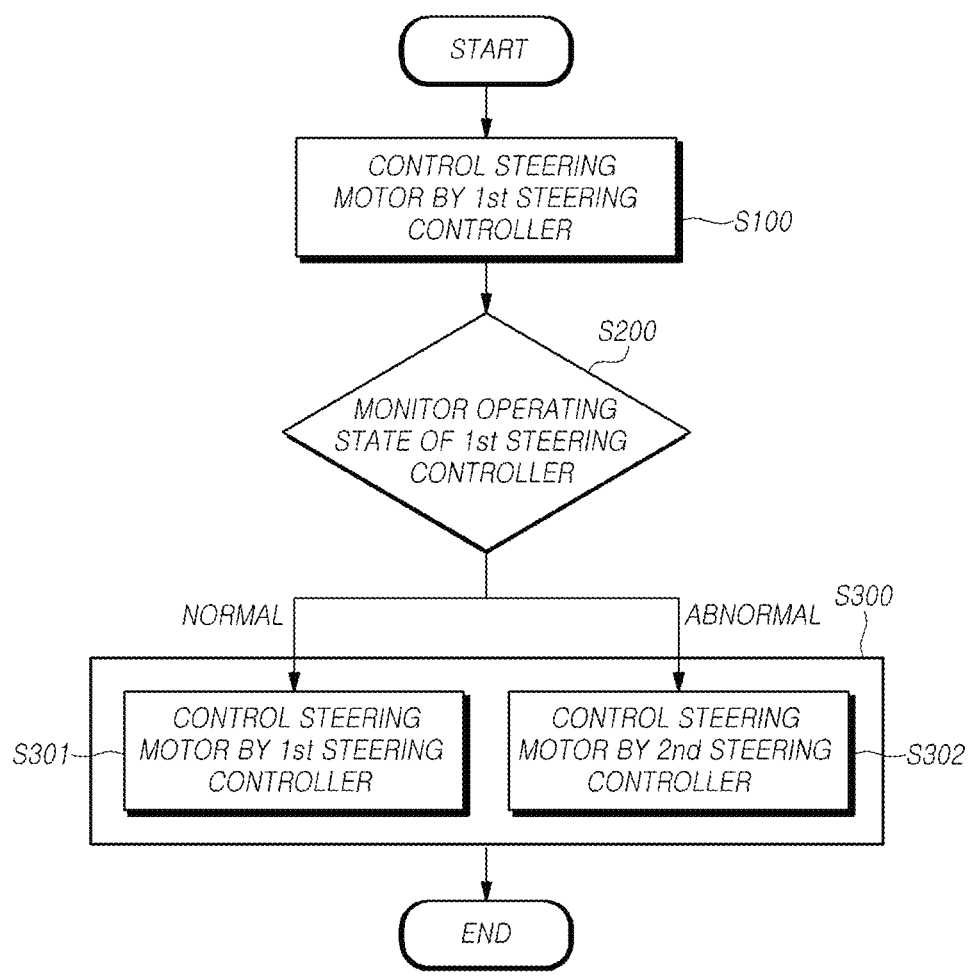
FIG. 13 is a flowchart schematically illustrating the steering method for a vehicle according to exemplary embodiments.

FIG. 13 is a flowchart schematically illustrating the vehicle steering method according to exemplary embodiments.

Referring to FIG. 13, the vehicle steering method according to exemplary embodiments includes: step S100 of controlling the steering motor by the first steering controller; step S200 of monitoring an operating state of the first steering controller by the second steering controller; and step S300 of determining the right of control of the steering motor by the second steering controller.

First, in S100, the steering motor may be controlled by the first steering controller.

Afterwards, in S200, the second steering controller may monitor the operating state of the first steering controller via the internal communications network.

Afterwards, in S300, the right of control of the steering motor may be determined by the second steering controller, based on the result of the monitoring in step S200.

That is, if the operating state of the first steering controller currently controlling the steering motor is normal, based on the result of the monitoring, the second steering controller may allow the right of control of the steering motor to be retained by the first steering controller 110 and the steering motor to be continuously controlled by the first steering controller (S301).

In addition, if the operating state of the first steering controller currently controlling the steering motor is abnormal, based on the result of the monitoring, the second steering controller may transfer the right of control of the steering motor thereto from the first steering controller and control the steering motor based on the transferred right of control (S302).

FIGS. 14 to 18 are flowcharts specifically illustrating the vehicle steering method according to exemplary embodiments.

Figure 14:
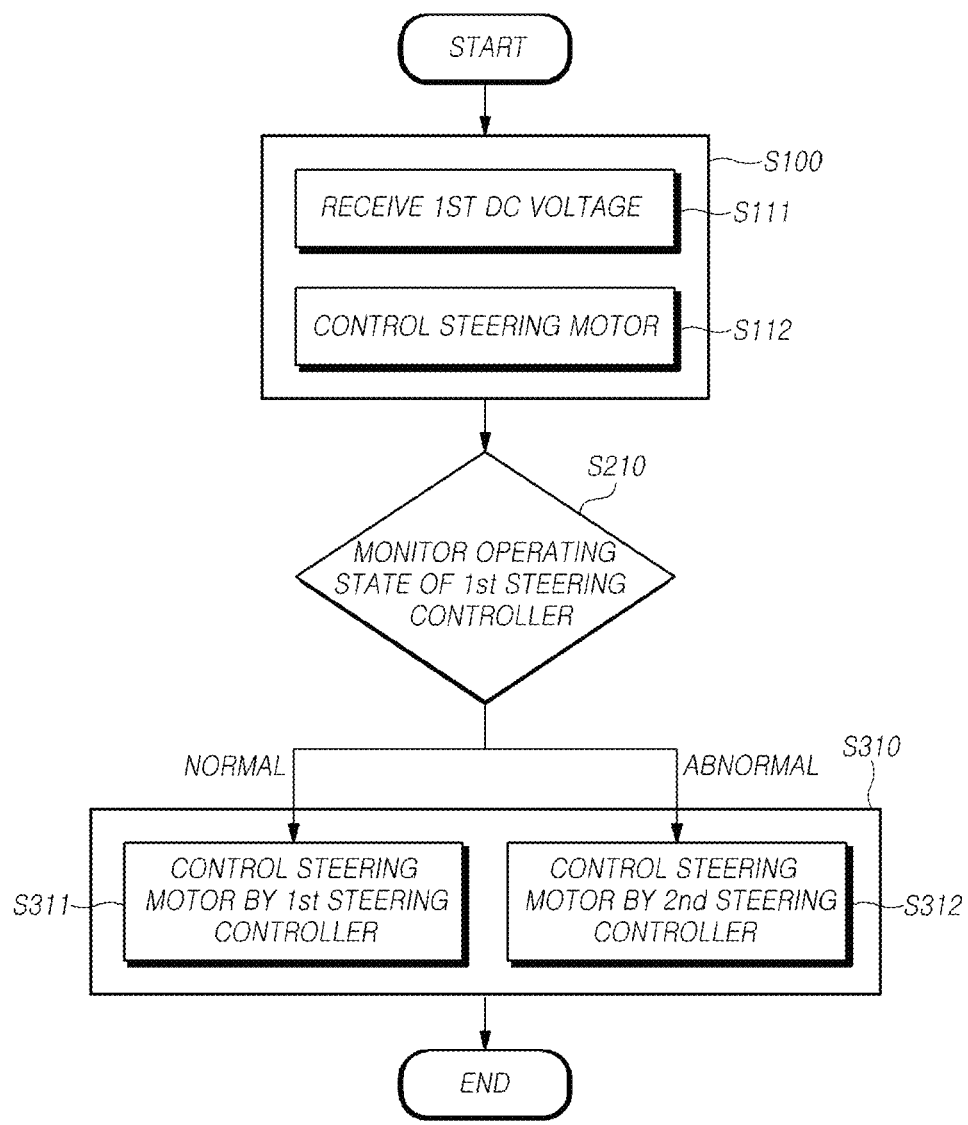
FIGS. 14 to 18 are flowcharts specifically illustrating the steering method for a vehicle according to exemplary embodiments.

Referring to FIG. 14, first, in step S111, the first steering controller may receive a first DC voltage from the DC power source. For example, first, the DC power source may provide a first voltage. Afterwards, the first steering controller may receive the first voltage via the first fuse.

Afterwards, in step S112, the first steering controller may control the steering motor using the first DC voltage received from the DC power source (or via the first fuse). Afterwards, in step S210, the second steering controller may monitor the operating state of the first steering controller via the internal communications network.

Subsequently, in step S310, the right of control of the steering motor may be determined by the second steering controller, based on the result of the monitoring in step S210.

That is, if the first DC voltage supplied from the DC power source to the first steering controller is normal, based on the result of the monitoring, the second steering controller may allow the right of control of the steering motor to be retained by the first steering controller and the steering motor to be continuously operated by the first steering controller (S311).

In particular, if the first fuse is normal, based on the result of the monitoring, the second steering controller may allow the steering motor to be continuously operated by the first steering controller.

In addition, if the first DC voltage supplied from the DC power source to the first steering controller is abnormal, based on the result of the monitoring, the second steering controller may transfer the right of control of the steering motor thereto from the first steering controller and control the steering motor using a second DC voltage received from the DC power source (S312).

In particular, if the first fuse is blown, based on the result of the monitoring, the second steering controller may receive the second DC voltage from the DC power source via the second fuse and control the steering motor using the second DC voltage.

Figure 15:
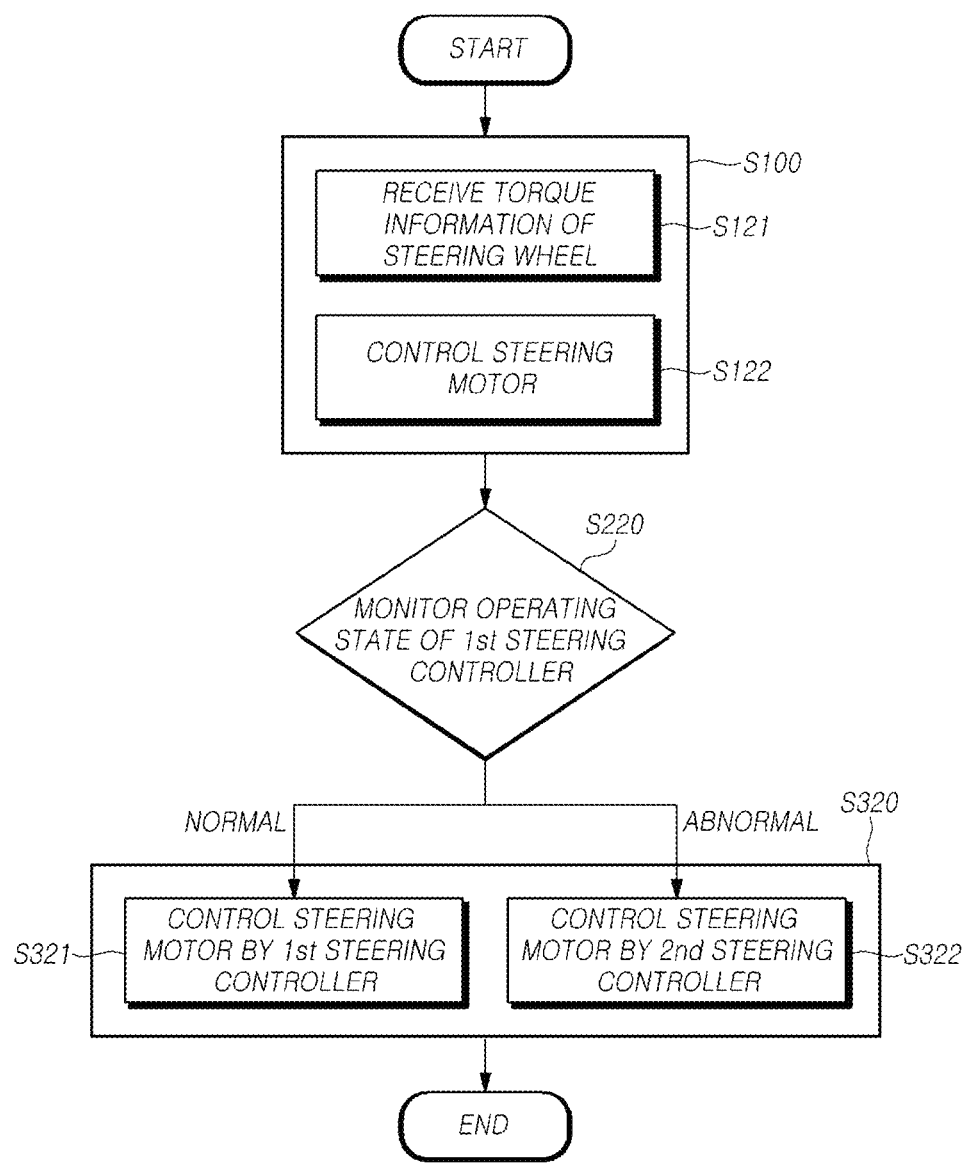

Referring to FIG. 15, first, in step S121, the first steering controller may receive torque information of the steering wheel from the at least one first steering torque sensor.

Afterwards, in step S122, the first steering controller may control the steering motor based on the torque information of the steering wheel received from the at least one first steering torque sensor.

Subsequently, in step S220, the second steering controller may monitor the operating state of the first steering controller via the internal communications network.

Afterwards, in step S320, the second steering controller may determine the right of control of the steering motor, based on the result of the monitoring in step S220.

That is, if the torque information of the steering wheel provided from the at least one first steering torque sensor to the first steering controller is normal, based on the result of the monitoring, the second steering controller may allow the right of control of the steering motor to be retained by the first steering controller and the steering motor to be continuously controlled by the first steering controller (S321).

In addition, if the torque information of the steering wheel provided from the at least one first steering torque sensor to the first steering controller is abnormal, based on the result of the monitoring, the second steering controller may transfer the right of control of the steering motor thereto from the first steering controller and control the steering motor based on torque information of the steering wheel received from the at least one second steering torque sensor (S322).

Figure 16:
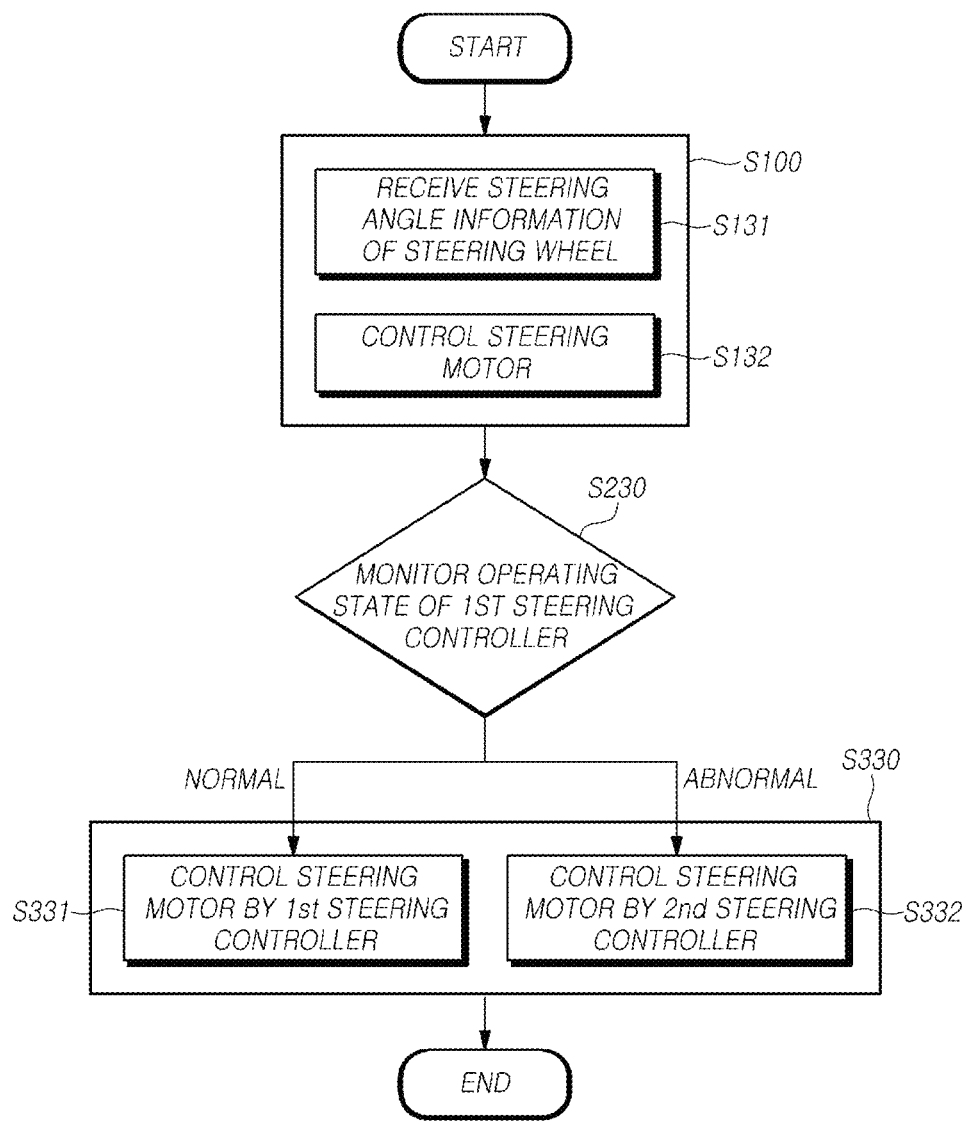

Referring to FIG. 16, first, in step S131, the first steering controller may be provided with steering angle information of the steering wheel from the at least one first steering angle sensor.

Afterwards, in step S132, the first steering controller may control the steering motor based on the steering angle information of the steering wheel received from the at least one first steering angle sensor.

Subsequently, in step S230, the second steering controller may monitor the operating state of the first steering controller via the internal communications network.

Afterwards, in step S330, the second steering controller may determine the right of control of the steering motor based on the result of the monitoring in step S230.

That is, if the steering angle information of the steering wheel provided from the at least one first steering angle sensor to the first steering controller is normal, based on the result of the monitoring, the second steering controller may allow the right of control of the steering motor to be retained by the first steering controller and the steering motor to be continuously controlled by the first steering controller (S331).

In addition, if the steering angle information of the steering wheel provided from the at least one first steering angle sensor to the first steering controller is abnormal, based on the result of the monitoring, the second steering controller may transfer the right of control of the steering motor thereto from the first steering controller and control the steering motor based on steering angle information of the steering wheel received from the at least one second steering angle sensor (S332).

Figure 17:
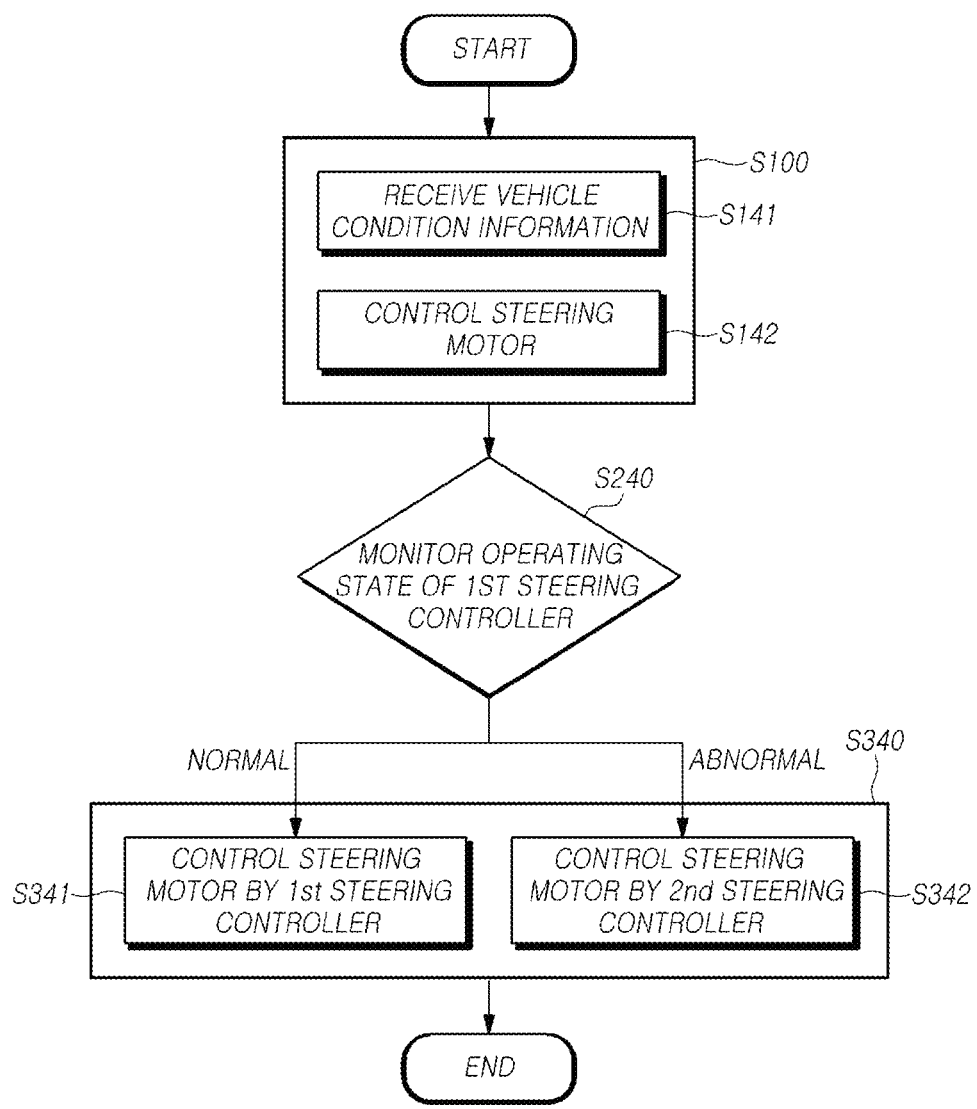

Referring to FIG. 17, first, in step S141, the first steering controller may receive vehicle condition information from the vehicle via the first external communication network.

Afterwards, in step S142, the first steering controller may control the steering motor based on the vehicle condition information received from the vehicle via the first external communication network.

Subsequently, in step S240, the second steering controller may monitor the operating state of the first steering controller via the internal communications network.

Afterwards, in step S340, the second steering controller may determine the right of control of the steering motor based on the result of the monitoring in step S240.

That is, if the vehicle condition information received from the vehicle via the first external communication network is normal, based on the result of the monitoring, the second steering controller may allow the right of control of the steering motor to be retained by the first steering controller and the steering motor to be continuously controlled by the first steering controller (S341).

In addition, if the vehicle condition information received from the vehicle via the first external communication network is abnormal, based on the result of the monitoring, the second steering controller may transfer the right of control of the steering motor thereto from the first steering controller and control the steering motor based on vehicle condition information received from the vehicle via the second external communications network.

Figure 18:
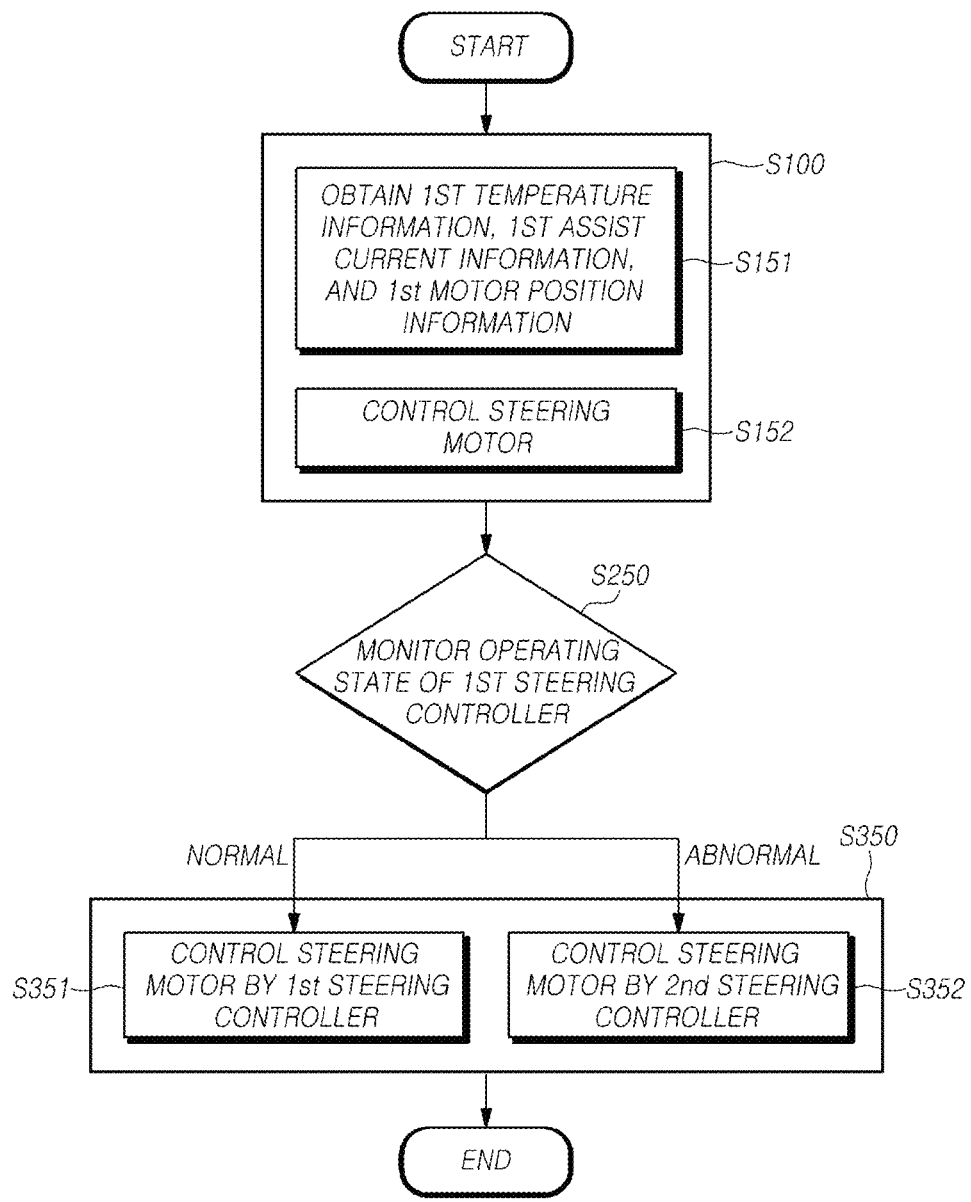

Referring to FIG. 18, first, in step S151, the first steering controller may obtain first temperature information of the first steering controller, first assist current information regarding first assist current to be supplied to the steering motor, and first motor position information of the steering motor.

Afterwards, in step S152, the first steering controller may generate a first gate signal based on the first temperature information, the first assist current information, and the first motor position information obtained above, generate the first assist current by adjusting the first inverter based on the generated first gate signal, and control the steering motor based on the first gate signal.

Subsequently, in step S250, the second steering controller may monitor the operating state of the first steering controller via the internal communications network.

Afterwards, in step S350, the second steering controller may determine the right of control of the steering motor based on the result of the monitoring in step S250.

That is, if the operating state of the first steering controller is normal, i.e. if the first temperature information, the first assist current information, the first motor position information, the first gate signal, and the first assist current are normal, based on the result of the monitoring, the second steering controller may allow the right of control of the steering motor to be retained by the first steering controller and the steering motor to be continuously controlled by the first steering controller (S351).

In addition, if the operating state of the first steering controller is abnormal, i.e. if at least one of the first temperature information, the first assist current information, the first motor position information, the first gate signal, or the first assist current is abnormal, based on the result of the monitoring, the second steering controller may transfer the right of control of the steering motor thereto from the first steering controller, generate a second gate signal based on second temperature information, second assist current information, and second motor position information of the steering motor, generate second assist current by adjusting the inverter based on the generated second gate signal, and control the steering motor based on the generated second assist current (S352).

The respective methods of controlling the steering motor using the first steering controller according to exemplary embodiments have been described separately, for the sake of brevity, with reference to FIGS. 14 to 18, but are not limited thereto. The methods illustrated in FIGS. 14 to 18 may be selectively combined.

For example, the first steering controller may generate a first gate signal based on at least one information of a first DC voltage provided from the DC power source (or via the first fuse), torque information of the steering wheel provided from the at least one first steering torque sensor, steering angle information of the steering wheel provided from the at least one first steering angle sensor, vehicle condition information provided from the vehicle via the first external communications network, obtained first temperature information of the first steering controller, obtained first assist current information provided from the steering motor, or obtained first motor position information of the steering motor; generate first assist current by adjusting the first inverter based on the generated first gate signal; and control the steering motor based on the first assist current.

The respective methods of controlling the steering motor using the second steering controller according to exemplary embodiments have been described separately, for the sake of brevity, with reference to FIGS. 14 to 18, but are not limited thereto. The methods illustrated in FIGS. 14 to 18 may be selectively combined.

For example, if the operating state of the first steering controller is abnormal, i.e. at least one of the first motor position information, the first temperature information, the first assist current information, the vehicle condition information, the first assist current, the first gate signal, the first watchdog signal, the first DC voltage, or the first operating voltage is abnormal, based on the result of the monitoring, the second steering controller may generate a second gate signal based on at least one information of a second DC voltage provided from the DC power source (or via the second fuse), torque information of the steering wheel provided from the at least one second steering torque sensor, steering angle information of the steering wheel provided from the at least one second steering angle sensor, vehicle condition information provided from the vehicle via the second external communications network, obtained second temperature information of the second steering controller, obtained second assist current information provided from the steering motor, or obtained second motor position information of the steering motor; generate second assist current by adjusting the second inverter based on the generated second gate signal; and control the steering motor based on the second assist current.

Figure 19:
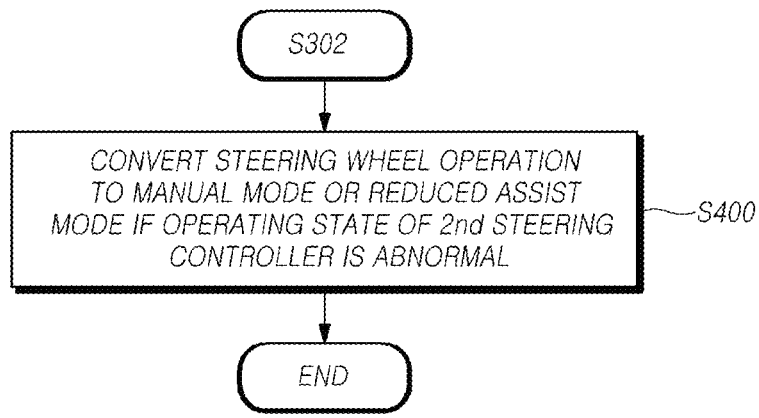
FIG. 19 is a flowchart specifically illustrating the steering method for a vehicle in the case in which the operating state of the steering method according to exemplary embodiments is abnormal.

FIG. 19 is a flowchart specifically illustrating the vehicle steering method in the case in which the operating state of the steering method according to exemplary embodiments is abnormal.

Referring to FIG. 19, after step S302, if the operating state of the first steering controller is abnormal and the operating state of the second steering controller is abnormal, the operation of the steering wheel may be switched to a manual mode or a reduced assist mode.

Figure 20:
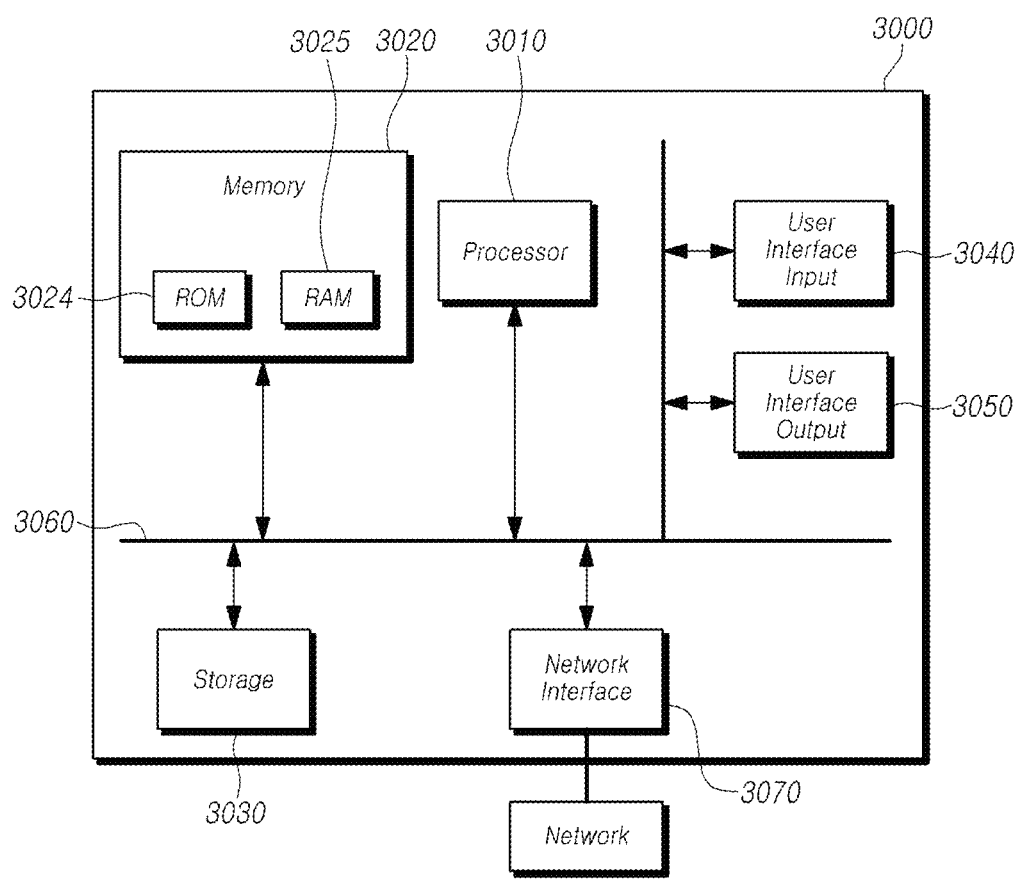
FIG. 20 is a block diagram illustrating a computer system of the steering apparatus for a vehicle according to exemplary embodiments.

FIG. 20 is a block diagram illustrating a computer system of the vehicle steering apparatus according to exemplary embodiments.

As set forth above, the exemplary embodiments may be realized, for example, in the form of a computer readable recording medium within a computer system. As illustrated in the drawings, a computer system 3000, such as a vehicle steering apparatus, may include at least one component among at least one processor 3010, a memory 3020, a storage 3030, a user interface input element 3040, and a user interface output element 3050. These components can communicate with each other via a bus 3060. In addition, the computer system 300 may further include a network interface 3070 by which the computer system 300 can access a network. The processor may be a central processing unit (CPU) or a semiconductor device executing processing commands stored in at least one of the memory 3020 or the storage 3030. Each of the memory 3020 and the storage 3030 may be one of various types of volatile/nonvolatile storage media. For example, the memory may include read-only memory (ROM) 3021 and random access memory (RAM) 3023.

Accordingly, the exemplary embodiments may be realized as a computer executable method or a nonvolatile computer readable recording medium in which computer executable instructions are recorded.

What is claimed is:

1. A steering apparatus for a vehicle, comprising:
   steering controllers configured to control a steering motor, the steering controllers comprising first and second steering controllers; and
   an internal communications network connecting the steering controllers,
   wherein:
   each of the steering controllers is configured to monitor an operating state of another steering controller using the internal communications network, so that, if one of the steering controllers controlling the steering motor operates abnormally, the steering motor is controlled by at least one steering controller of the remaining steering controllers,
   if an ignition is switched to an on-state and an engine is in a stopped state, the first and second steering controllers are configured to test an initialization state, and if a test result of the initialization state is normal, the steering apparatus for the vehicle is configured to be operated in a passive state, and
   if the ignition is in the on-state and the endue is switched to a running state, the first steering controller is configured to assist steering apparatus, and the second steering controller is configured to be in a standby state to monitor first steering controller.

2. The steering apparatus according to claim 1,
   wherein the second steering controller monitors the operating state of the first steering controller via the internal communications network, and if the operating state of the first steering controller is abnormal, based on a result of the monitoring, transfers right of control of the steering motor thereto from the first steering controller to the second steering controller to control the steering motor.

3. The steering apparatus according to claim 2, further comprising a DC power source supplying a first DC voltage to the first steering controller and a second DC voltage to the second steering controller,
   wherein the second steering controller monitors the operating state of the first steering controller via the internal communications network, and if the first DC voltage supplied from the DC power source to the first steering controller is abnormal, based on a result of the monitoring, receives the second DC voltage from the DC power source to control the steering motor using the second DC voltage.

4. The steering apparatus according to claim 3, further comprising:
   a first fuse located between the DC power source and the first steering controller; and
   a second fuse located between the DC power source and the second steering controller,
   wherein the second steering controller monitors the operating state of the first steering controller controlling the steering motor via the internal communications network, and if the first fuse is blown, based on a result of the monitoring, receives the second DC voltage via the second fuse and controls the steering motor using the second DC voltage.

5. The steering apparatus according to claim 2, further comprising:
   at least one first steering torque sensor providing torque information of the steering wheel to the first steering controller; and
   at least one second steering torque sensor providing torque information of the steering wheel to the second steering controller,
   wherein the second steering controller monitors the operating state of the first steering controller controlling the steering motor via the internal communications network, and if the torque information of the steering wheel provided to the first steering controller from the at least one first steering torque sensor is abnormal, based on a result of the monitoring, receives the torque information of the steering wheel from the at least one second steering torque sensor and controls the steering motor based on the received torque information.

6. The steering apparatus according to claim 2, further comprising:
   at least one first steering angle sensor providing steering angle information of the steering wheel to the first steering controller; and
   at least one second steering angle sensor providing steering angle information of the steering wheel to second steering controller,
   wherein the second steering controller monitors the operating state of the first steering controller controlling the steering motor via the internal communications network, and if the steering angle information of the steering wheel provided to the first steering controller from the at least one first steering angle sensor is abnormal, based on the result of the monitoring, receives the steering angle information of the steering wheel from the at least one second steering angle sensor and controls the steering motor based on the received steering angle information.

7. The steering apparatus according to claim 2, further comprising:
   a first external communications network connecting the first steering controller and a vehicle;
   a second external communications network connecting the second steering controller and the vehicle,
   wherein the second steering controller monitors the operating state of the first steering controller controlling the steering motor via the internal communications network, and if vehicle condition information provided from the vehicle via the first external communications network is abnormal, receives vehicle condition information from the vehicle via the second external communications network and controls the steering motor based on the received vehicle condition information.

8. The steering apparatus according to claim 2, wherein the first steering controller comprises:
   a first sensor obtaining first motor position information of the steering motor;
   a first communicator receiving vehicle condition information from the vehicle;
   a first controller generating a first gate signal, based on torque information of the steering wheel provided from at least one first steering torque sensor, steering angle information of the steering wheel provided from at least one first steering angle sensor, the first motor position information provided from the first sensor, and the vehicle condition information provided from the first communicator; and a first steering motor power supply generating first assist current based on the first gate signal received from the first controller and providing the first assist current to the steering motor, wherein the second steering controller monitors the operating state of the first steering controller controlling the steering motor via the internal communications network, and if the operating state of the first steering controller is abnormal, based on a result of the monitoring, controls the steering motor using at least one of a second sensor, a second communicator, a second controller, or a second steering motor power supply.

9. The steering apparatus according to claim 1, wherein if the ignition is in an off-state and the engine is in the stopped state, the first steering controller and the second steering controller are configured to be in the off state, if the ignition is in the on-state and the engine is switched to the stopped state, the first steering controller and the second steering controller are configured to operate the steering apparatus in the passive state, and if the engine is in the stopped state and the ignition is switched to the off-state, the first steering controller and the second steering controller are configured to be in the off-state.

10. The steering apparatus according to claim 1,
wherein, in a case in which an ignition is in the on-state, the engine is in the running state, and the second steering controller assists the steering apparatus for a vehicle in place of the first steering controller due to abnormality of the first steering controller, if the second steering controller is switched to an abnormal state, the steering apparatus of the vehicle is switched to a reduced assist mode or a manual mode.

11. A steering apparatus for a vehicle, comprising:
steering controllers configured to control a steering motor, the steering controllers comprising first and second steering controllers; and
an internal communications network connecting the steering controllers,
wherein;
each of the steering controllers is configured to monitor an operating state of another steering controller using the internal communications network, so that, if one of the steering controllers controlling the steering motor operates abnormally, the steering motor is controlled by at least one steering controller of the remaining steering controllers, if an ignition is switched to an on-state and an engine is in a stopped state, the first steering controller and the second steering controller are configured to test an initialization state, if a test result of the initialization state is normal, the steering apparatus for the vehicle is configured to be operated in a passive state, the first steering controller is configured to operate as a slave, the second steering controller is configured to operate the steering apparatus in the passive state and to be switched to a standby state to assist the steering apparatus, if the ignition is in the on-state and the engine is switched to a running state, the first steering controller is configured to remain operating as the slave, and the second steering controller is configured to assist steering apparatus in place of the first steering controller.

12. The steering apparatus according to claim 11, wherein:
if the ignition is in an off-state and the engine is in the stopped state, the first steering controller and the second steering controller are in the off-state,
if the ignition is in the on-state and the engine is switched to the stopped state, the first steering controller is configured to remain operating as the slave, and the second steering controller is configured to assist assists the steering apparatus in place of the first steering controller, and
if the engine is in the stopped state and the ignition is switched to the off-state, the first steering controller and the second steering controller are in the off-state.

13. A method for controlling a steering apparatus for a vehicle, using a first steering controller and a second steering controller connected to each other via an internal communication network, the method comprising:
controlling a steering motor by the first steering controller;
monitoring an operating state of the first steering controller by the second steering controller; and
if the operating state of the first steering controller is abnormal, based on a result of the monitoring, controlling the steering motor by the second steering controller,
wherein:
if an ignition is switched to an on-state and an engine is in a stopped state, the first and second steering controllers test an initialization state, and if a test result of the initialization state is normal, the steering apparatus for the vehicle is operated in a passive state, and
if the ignition is in the on-state and the engine is switched to a running state, the first steering controller assists the steering apparatus, and the second steering controller is in a standby state to monitor the first steering controller.

14. The method according to claim 13, wherein the controlling of the steering motor by the first steering controller comprises:
receiving, by the first steering controller, a first DC voltage from a DC power source; and
controlling, by the first steering controller, the steering motor using the first DC voltage supplied from the DC power source, and
wherein the controlling of the steering motor by the second steering controller comprises:
if the first DC voltage supplied from the DC power source to the first steering controller is abnormal, based on a result of monitoring, receiving, by the second steering controller, a second DC voltage from the DC power source; and
controlling, by the second steering controller, the steering motor using the second DC voltage received from the DC power source.

15. The method according to claim 13, wherein the controlling of the steering motor by the first steering controller comprises:
receiving, by the first steering controller, vehicle condition information from the vehicle via a first external communications network;
controlling, by the first steering controller, the steering motor based on the vehicle condition information received from the vehicle via the first external communications network, wherein the controlling of the steering motor by the second steering controller comprises:
   if the vehicle condition information received from the vehicle via the first external communications network is abnormal, based on a result of monitoring, receiving, by the second steering controller, vehicle condition information from the vehicle via a second external communications network; and
   controlling, by the second steering controller, the steering motor based on the vehicle condition information from the vehicle via the second external communications network.

16. The method according to claim 13, wherein the controlling of the steering motor by the first steering controller comprises:
   obtaining, by the first steering controller, first temperature information of the first steering controller, first assist current information for the steering motor, and first motor position information of the steering motor; and
   generating, by the first steering controller, a first gate signal based on the first temperature information, the first assist current information, and the first position information obtained, generating first assist current by adjusting a first inverter based on the generated first gate signal, and controlling the steering motor using the first assist current, and
   wherein the controlling of the steering motor by the second steering controller comprises:
   if the operating state of the first steering controller is abnormal, based on a result of monitoring, obtaining, by the second steering controller, second temperature information of the second steering controller, second assist current information for the steering motor, and second motor position information of the steering motor; and
   generating, by the second steering controller in place of the first steering controller, a second gate signal based on the second temperature information, the second assist current information, and the second motor position information obtained, generating second assist current by adjusting a second inverter based on the generated second gate signal, and controlling the steering motor using the second assist current.

17. The method according to claim 13, wherein:
   if the ignition is in an off-state and the engine is in the stopped state, the first steering controller and the second steering controller are in the off-state,
   if the ignition is in the on-state and the engine is switched to the stopped state, the first steering controller and the second steering controller operate the steering apparatus in the passive state, and
   if the engine is in the stopped state and the ignition is switched to the off-state, the first steering controller and the second steering controller are in the off-state.

\* \* \* \* \*